US008412453B2

(12) United States Patent
Suzaki et al.

(10) Patent No.: US 8,412,453 B2
(45) Date of Patent: Apr. 2, 2013

(54) NAVIGATION DEVICE

(75) Inventors: Yukihiko Suzaki, Saitama (JP); Yoshitaka Terasoma, Saitama (JP)

(73) Assignee: Honda Access Corp., Niiza-shi, Saitama (JP)

( * ) Notice: Subject to any disclaimer, the term of this patent is extended or adjusted under 35 U.S.C. 154(b) by 63 days.

(21) Appl. No.: 13/060,616

(22) PCT Filed: Mar. 23, 2009

(86) PCT No.: PCT/JP2009/001275
§ 371 (c)(1),
(2), (4) Date: Feb. 24, 2011

(87) PCT Pub. No.: WO2010/050082
PCT Pub. Date: May 6, 2010

(65) Prior Publication Data
US 2011/0153207 A1  Jun. 23, 2011

(30) Foreign Application Priority Data
Oct. 31, 2008  (JP) ................................ 2008-281089

(51) Int. Cl.
*G01C 21/32* (2006.01)
(52) U.S. Cl. ............................ 701/409; 713/185; 701/36
(58) Field of Classification Search .................. 701/208, 701/409; 713/185; 455/557
See application file for complete search history.

(56) References Cited

U.S. PATENT DOCUMENTS

| 5,887,269 | A | * | 3/1999 | Brunts et al. ............... 701/486 |
| 6,094,618 | A | * | 7/2000 | Harada ........................ 701/36 |
| 2005/0131631 | A1 | * | 6/2005 | Nakano et al. ............... 701/200 |
| 2007/0086724 | A1 | | 4/2007 | Grady et al. |
| 2007/0211919 | A1 | * | 9/2007 | Nagaoka et al. ............. 382/104 |
| 2008/0140381 | A1 | * | 6/2008 | Koyasu et al. ................ 703/28 |
| 2008/0162925 | A1 | * | 7/2008 | Okaya .......................... 713/155 |
| 2008/0303909 | A1 | * | 12/2008 | Watanabe et al. ........... 348/211.2 |

FOREIGN PATENT DOCUMENTS

| EP | 2147827 A1 | 1/2010 |
| JP | 8-004390 A | 1/1996 |

(Continued)

OTHER PUBLICATIONS

International Search Report of PCT/JP2009/001275, mailing date Jun. 9, 2009.

(Continued)

*Primary Examiner* — Thomas Black
*Assistant Examiner* — Shardul Patel
(74) *Attorney, Agent, or Firm* — Westerman, Hattori, Daniels & Adrian, LLP

(57) ABSTRACT

A navigation device includes a base unit 10 which is mounted to a body of a vehicle, a front panel unit 14 which is detachably mounted to and connected to the base unit 10, the front panel unit having a navigation function of displaying map data on a front panel and displaying a location of the vehicle on the map data, and an authentication unit 30 which performs authentication to confirm that the base unit 10 and the front panel unit 14 have been connected to each other and, when confirmed, permits operation of an electrical control unit of the vehicle. The navigation device can be used as an antitheft device.

4 Claims, 35 Drawing Sheets

FOREIGN PATENT DOCUMENTS

| | | |
|---|---|---|
| JP | 2004-009958 A | 1/2004 |
| JP | 2004-114890 A | 4/2004 |
| JP | 2005-172560 A | 6/2005 |
| JP | 2006-273301 A | 10/2006 |
| JP | 2007-132719 A | 5/2007 |
| JP | 2008-009495 A | 1/2008 |
| JP | 2008-298766 A | 12/2008 |

OTHER PUBLICATIONS

European Search Report issued in Application No. 09823199.6 dated Apr. 10, 2012.

* cited by examiner

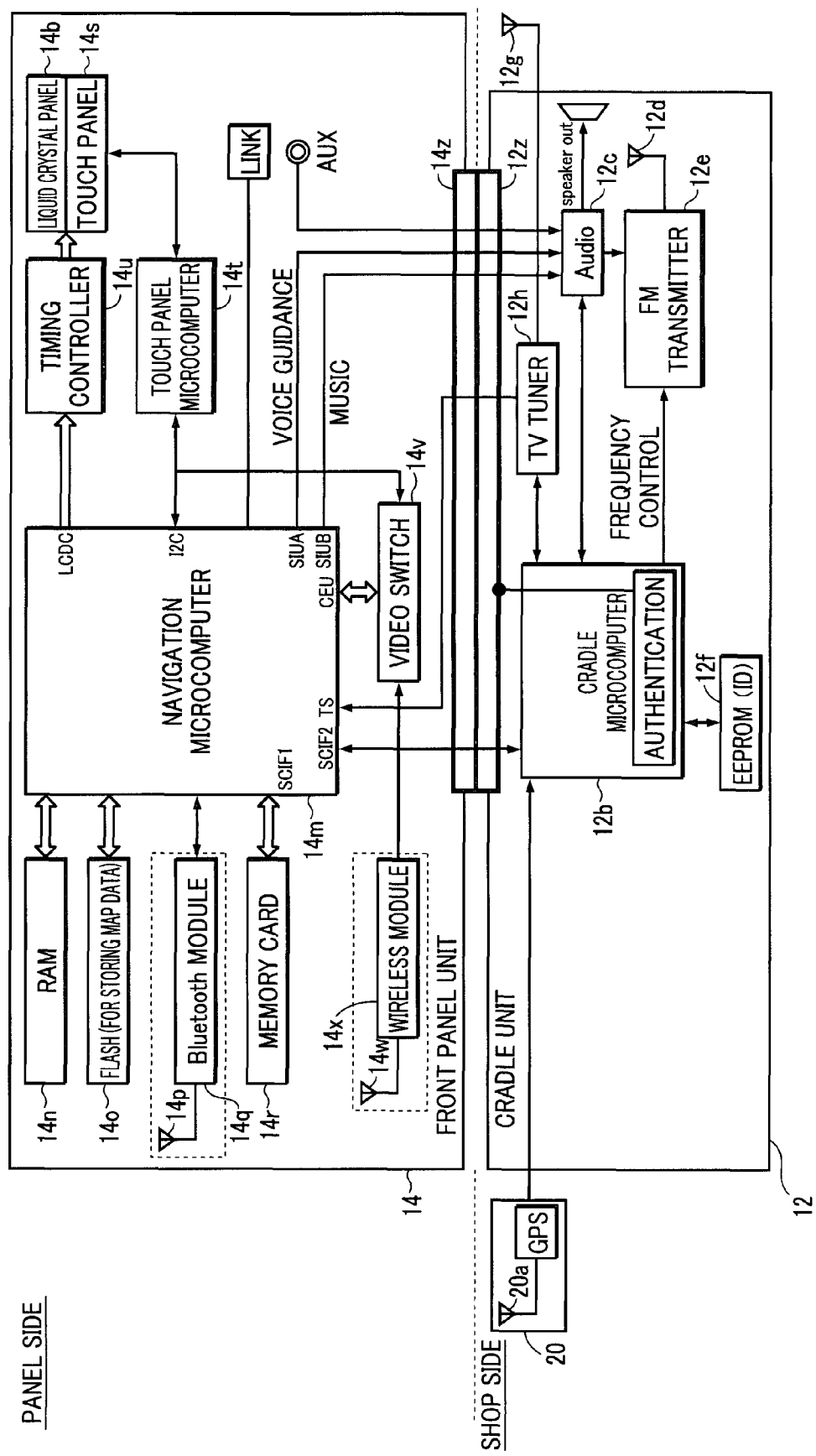

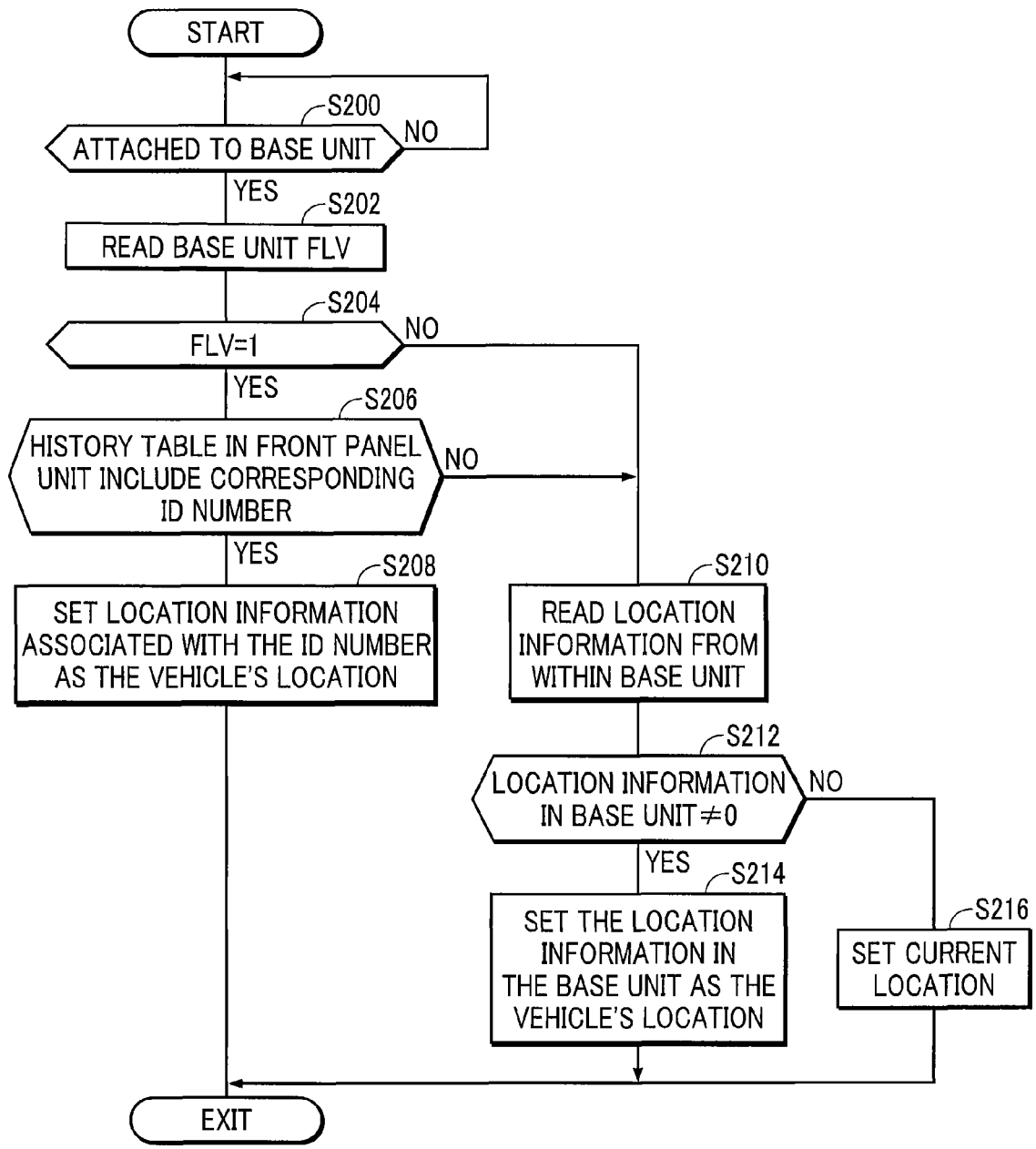

FIG.15

| STATE \ EVENT | REVERSE GEAR SW ON | INCOMING CALL | DVD PLAYING |
|---|---|---|---|
| BACKING UP | | REVEINCOMING CALL REFUSED REAR MONITOR MODE CONTINUED | MONITOR IMAGE RECEIVED FROM REAR CAMERA DVD STOPPED |
| | | RADIO WAVE: WCM | RADIO WAVE: WCM |
| | | VIDEO IMAGE: REAR CAMERA | VIDEO IMAGE: REAR CAMERA |
| CALL INCOMING | RINGING TONE CUT OFF REAR MONITOR MODE | | INCOMING CALL MODE DVD NOT PLAYED |
| | RADIO WAVE: WCM | | RADIO WAVE: BT |
| | VIDEO IMAGE: REAR CAMERA | | VIDEO IMAGE: CALLING SCREEN |
| LINE IN USE | LINE DISCONNECTED REAR MONITOR MODE | | TALKING MODE DVD NOT PLAYED |
| | RADIO WAVE: WCM | | RADIO WAVE: BT |
| | VIDEO IMAGE: REAR CAMERA | | VIDEO IMAGE: CALLING SCREEN |
| DVD PLAYING | DVD PLAYBACK STOPPED REAR MONITOR MODE | DVD AUDIO PLAYBACK STOPPED INCOMING CALL ACCEPTED | |
| | RADIO WAVE: WCM | RADIO WAVE: BT | |
| | VIDEO IMAGE: REAR CAMERA | VIDEO IMAGE: CALLING SCREEN | |

FIG.21

| HARDWARE BUTTON | SOFTWARE BUTTON |
|---|---|
| POWER SUPPLY | SWITCH AV SOURCE |
| EJECT | SET THE GUI BACK TO DEFAULT |
| DISPLAY CURRENT LOCATION | PLAY DVD |
| SET DESTINATION | STOP DVD |
| VOLUME UP (DOWN) | TUNING FREQUENCY UP |
| SKIP | TUNING FREQUENCY DOWN |
| DISPLAY MENU | |

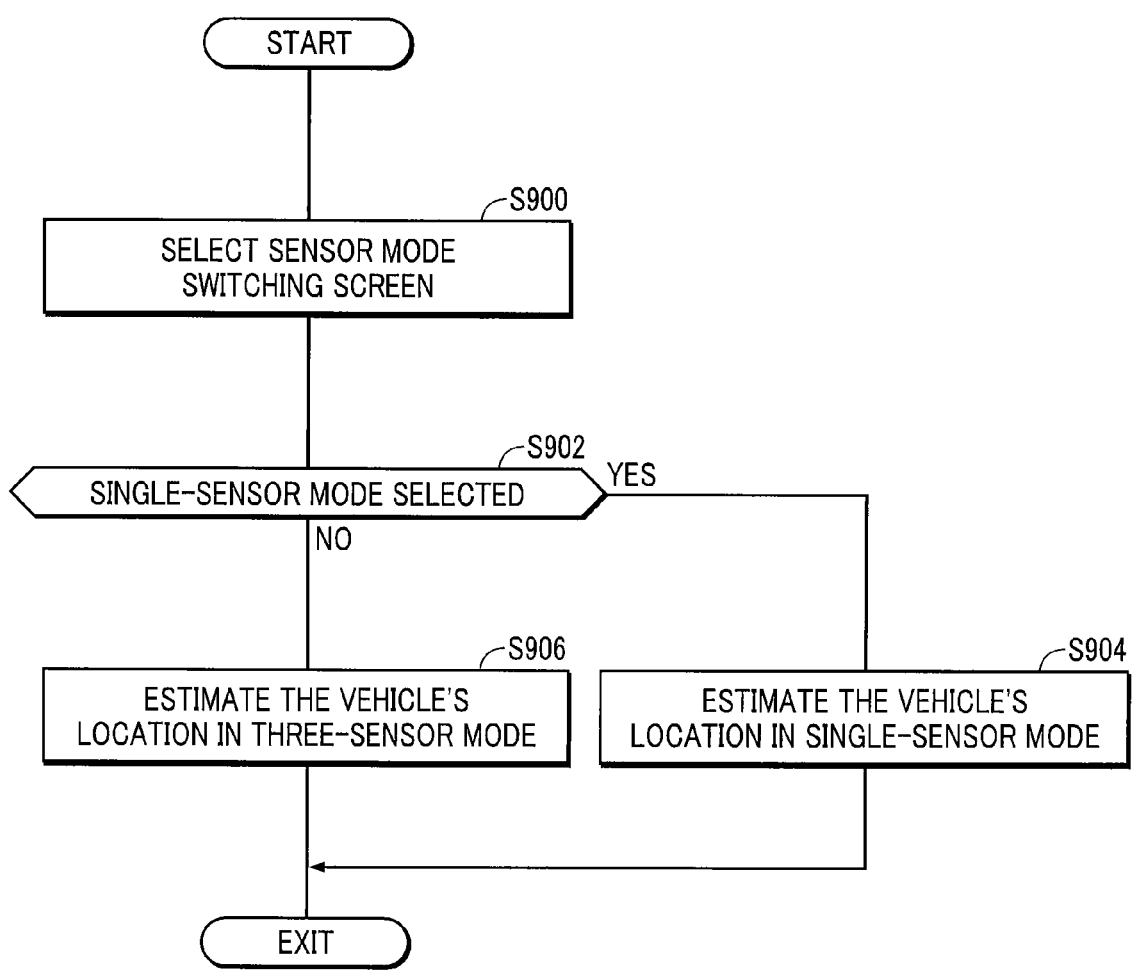

NAVIGATION DEVICE

TECHNICAL FIELD

The present invention relates to a navigation device which is mounted in a vehicle and transmits, to a driver, information for reaching a destination (including direction, map, route, and the like).

BACKGROUND ART

While navigation devices as described above were initially limited to those of the type integrally fixed to the vehicle, recently, those of the portable type easy to carry around have been proposed. Also proposed are navigation devices of the detachable type enabling only the portion provided with the navigation function to be detached, for further improvement of the usability. A navigation device of the detachable type includes a body (or, base unit) that is integrated with an audio device or other component installed in front of a driver's seat in the vehicle, and a portion (or, front panel unit) configured to be attachable to and detachable from the body. The detachable portion has the navigation function, and thus, even when detached from the body, it can be used outside the vehicle in which the body has been installed or taken home for use in destination search or the like.

On the other hand, antitheft measures are essential for vehicles including automobiles. As a way of enhancing the antitheft function, there has been proposed a configuration in which when a dedicated ID card (see Japanese Patent Application Laid-Open No. 2004-114890) or a driver's license card (see Japanese Patent Application Laid-Open No. 2006-273301) is inserted into a prescribed card receiver, the antitheft lock function is released to enable the operation of the ignition key, so that the engine can be started.

DISCLOSURE OF THE INVENTION

Problem to be Solved by the Invention

In recent vehicles, however, the navigation device described above is often installed in front of the driver's seat in addition to the audio and other components, making it difficult to secure a space for mounting the antitheft card receiver. For mounting the receiver, operability as well as the design around the driver's seat would have to be sacrificed.

In view of the foregoing, the present inventors have focused on using the navigation devices, which have increasingly been mounted in the vehicles, as a device for implementing the antitheft function. Accordingly, an object of the present invention is to implement an antitheft measure using an existing navigation device, rather than additionally providing a dedicated antitheft device. Another object of the present invention is to provide a navigation device which can be used as an antitheft device.

Means for Solving the Problem

The present invention provides a navigation device including a base portion mounted to a body of a vehicle and a display portion detachably mounted to and connected to the base portion, the display portion having a navigation function of displaying map data on a front panel and displaying a location of the vehicle on the map data, characterized by including: an authentication unit configured to perform authentication to confirm that the base portion has been connected to the display portion and, when confirmed, to enable operation of an electrical control unit of the vehicle, wherein the base portion is made up of either a base unit fastened to an inside of the vehicle or a cradle unit detachably mounted to the inside of the vehicle, the base unit, the cradle unit, and the display portion each store an authentication code, and the authentication unit is installed in the base unit or the cradle unit and performs the authentication by confirming that the authentication code stored in the base unit or the cradle unit has a predetermined relationship with the authentication code stored in the display portion.

According to the present invention, the operation of the electrical control unit of the vehicle is permitted when it is confirmed that the display portion has been connected to the base portion of the detachable-type navigation device. This can considerably improve the security level compared to the conventional key-based security function. The existing navigation device can be used for the above configuration for protecting against theft. This eliminates the need of an extra space for installation of an antitheft device.

As the authentication code, a vehicle-specific code stored in a memory included in the base portion, or a key code stored in a memory included in the display portion may be used.

It is preferable that the authentication unit is configured to allow modification (deletion or addition) of the authentication code when the current authentication code is input into the display portion in the state where the display portion is detached from the base portion. Setting a plurality of conditions in this manner can prevent the authentication code from being modified easily.

Further, in addition to the authentication code described above, it is preferable that the location information of the vehicle at the time when the display portion was detached is stored in the base portion and the display portion, and that the authentication is performed by matching the location information. This ensures a highly reliable antitheft measure, because in the event that a vehicle has been stolen by towing and the like, the authentication code cannot be changed unless the vehicle is returned to the place where the vehicle was stolen.

It is preferable that the authentication code is set such that it is changeable only at a location corresponding to preset location information.

For example, in the case of a test-driving car or a rental car used by unspecified persons, a duplicate of the ignition key or the like can be made with ease, making the vehicle prone to be stolen. When modification of the authentication code is allowed only in the location predetermined in advance, as described above, the authentication code cannot be changed in the place other than the preset area. This means that even when a person has a similar navigation device, the authentication code can be changed only in the area designated by a shop or a dealer. This can further enhance the security effect.

In addition, for a plurality of vehicles or for vehicles of chain stores, plurality of area codes may be registered in advance by area settings, which allows the authentication codes to be changed particularly at a shop which offers drop-off services of rental cars, so that antitheft management is facilitated.

The navigation device according the present invention may also include an image pickup device mounted to the vehicle and a transmitter configured to transmit an image signal thereof, and an authentication code may be added to the image signal and transmitted to the display portion that is in a detached state.

According to this configuration, the signal from the image pickup device installed in the vehicle may be transmitted to the front panel unit in the detached state, allowing a user to monitor the surroundings of the vehicle using the display portion taken into the house. The effects of preventing or deterring theft can be expected, without the need of newly providing a security camera or monitor, and confidentiality of the information can readily be guaranteed as well.

In the present invention, the navigation device having a detachable display portion works much like the ignition key of a vehicle. The antitheft performance can further be enhanced by combining the security code of the navigation device with the conventional, mechanical ignition key.

For example, for those who possess automobiles to be used by others, such as car dealers and car rental agents, even in the case where the ignition key of a test-driving car or a rental car is duplicated, it is possible to change the security code of the navigation device as appropriate to protect against theft.

Furthermore, whether or not the vehicle may start can be determined by comparing the map information in the navigation device with the current location (the car dealer shop or the car rental office).

When the navigation device is provided with a communication function, even in the event that a vehicle is stolen, the current location of the vehicle can readily be confirmed, which can deter theft.

BRIEF DESCRIPTION OF THE DRAWINGS

FIG. 6B is a block diagram showing the internal configurations of the front panel unit and the cradle unit;

FIG. 14 is a flowchart illustrating a process executed by the navigation microcomputer in the front panel unit in response to the process shown in FIG. 13;

FIG. 15 illustrates processes according to a priority order for preventing interference between the components shown in FIG. 6 and the like;

FIG. 21 illustrates examples of buttons that should not be erased during the function deleting process in FIG. 18;

FIG. 27 illustrates a configuration of the antenna shown in FIG. 6 and the like;

FIG. 28 illustrates another configuration of the antenna shown in FIG. 6 and the like;

FIG. 29 illustrates yet another configuration of the antenna shown in FIG. 6 and the like; and FIG. 30 is a flowchart, similar to the flowchart in FIG. 10, illustrating the operations of the navigation device according to a second embodiment of the present invention.

BEST MODE FOR CARRYING OUT THE INVENTION

Embodiments of the navigation device according to the present invention will now be described with reference to the accompanying drawings.

Figure 1:
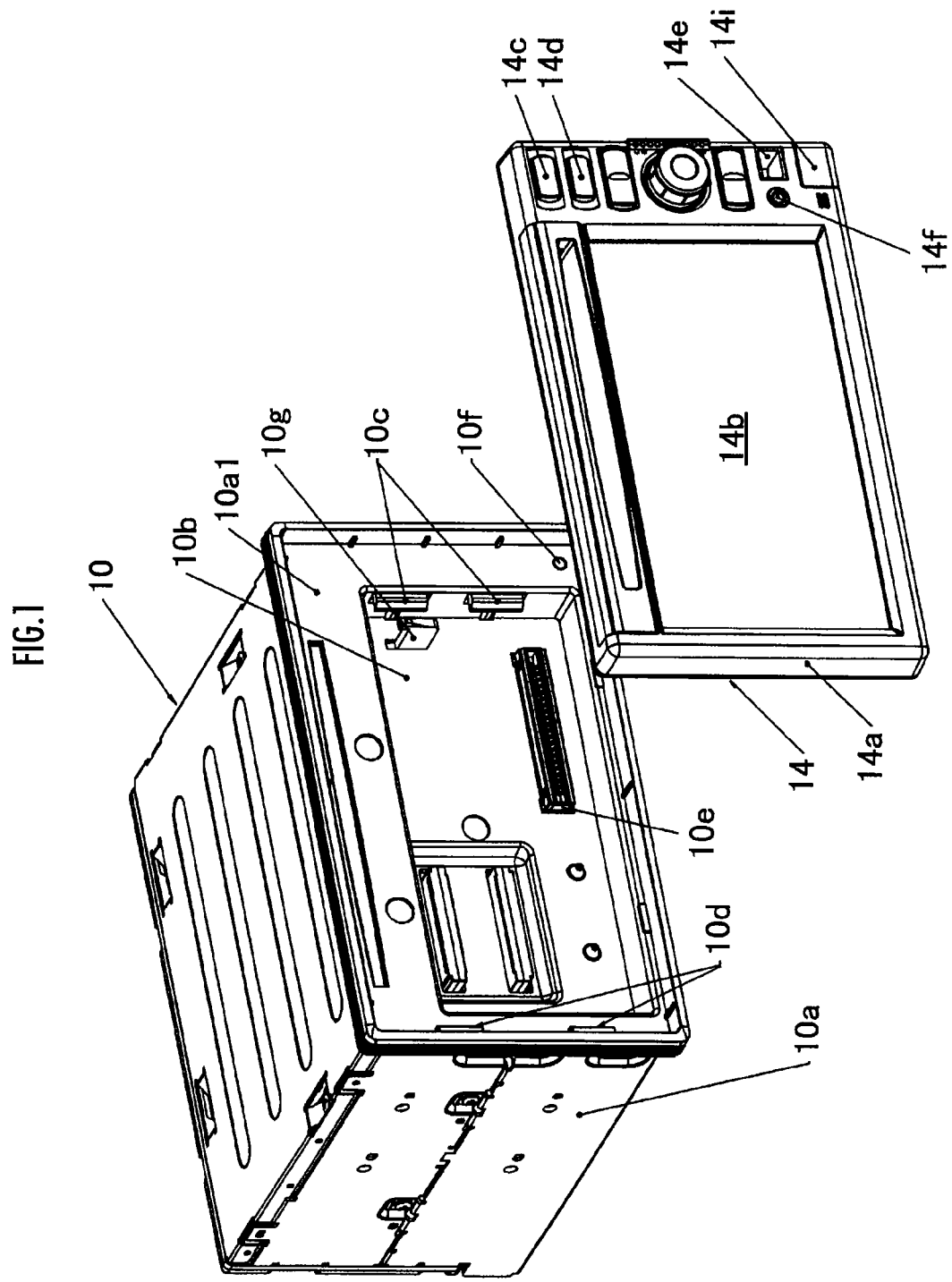
FIG. 1 is a perspective view, as seen from the front, of a base unit and a front panel unit in a navigation device according to an embodiment of the present invention.
Figure 2:
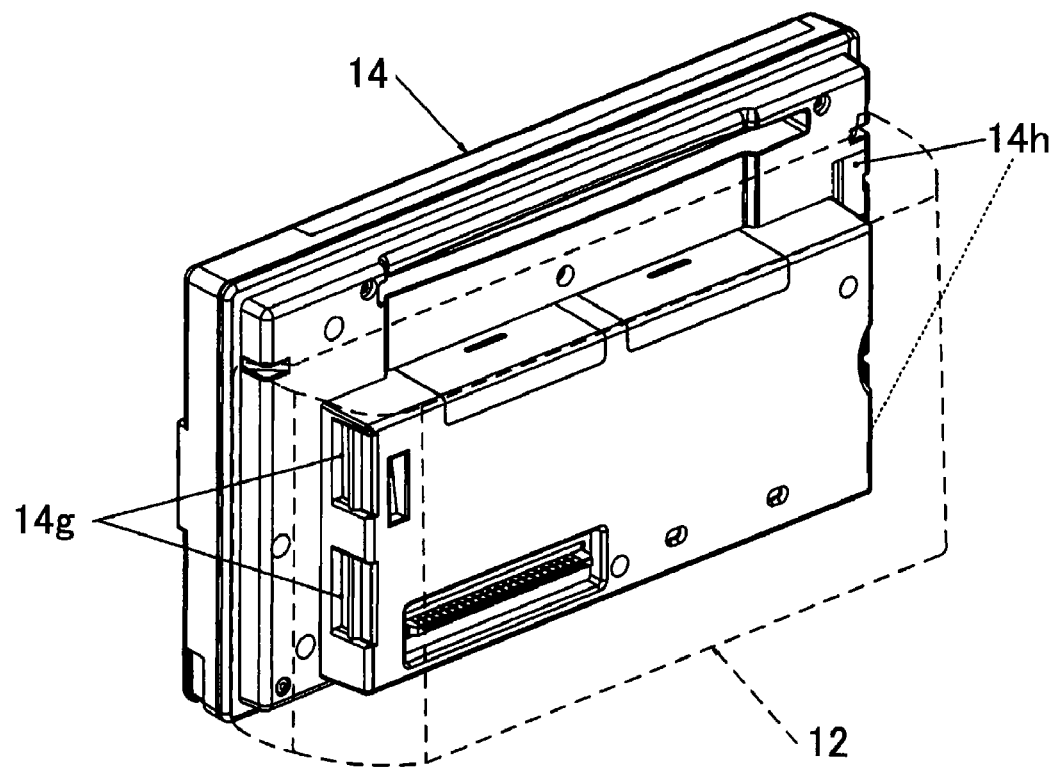
FIG. 2 is a perspective view, as seen from the back, of the front panel unit shown in FIG. 1.
Figure 3:
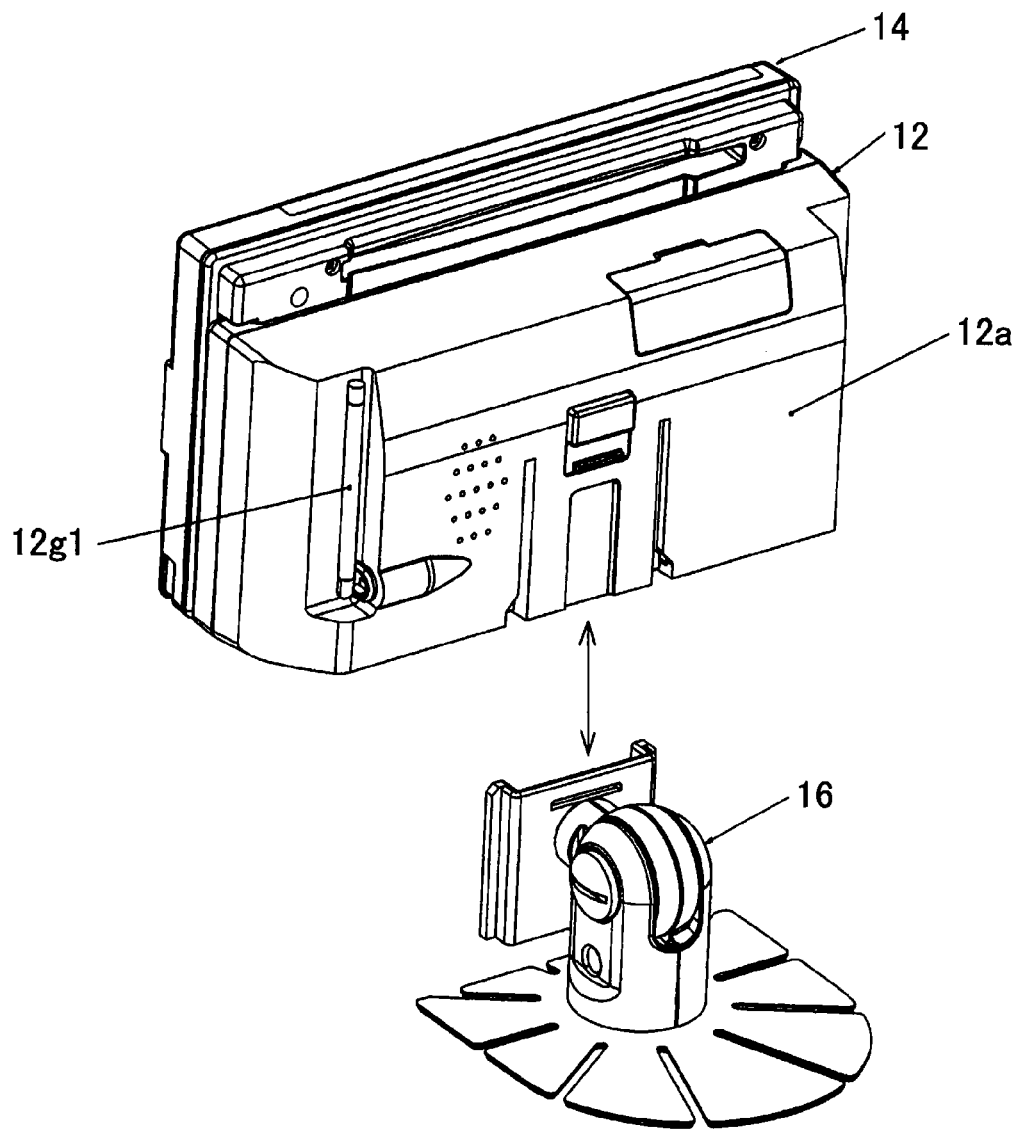
FIG. 3 is a perspective view of (the back side of) the front panel unit shown in FIG. 1, a cradle unit, and a cradle unit mounting arm.
Figure 4:
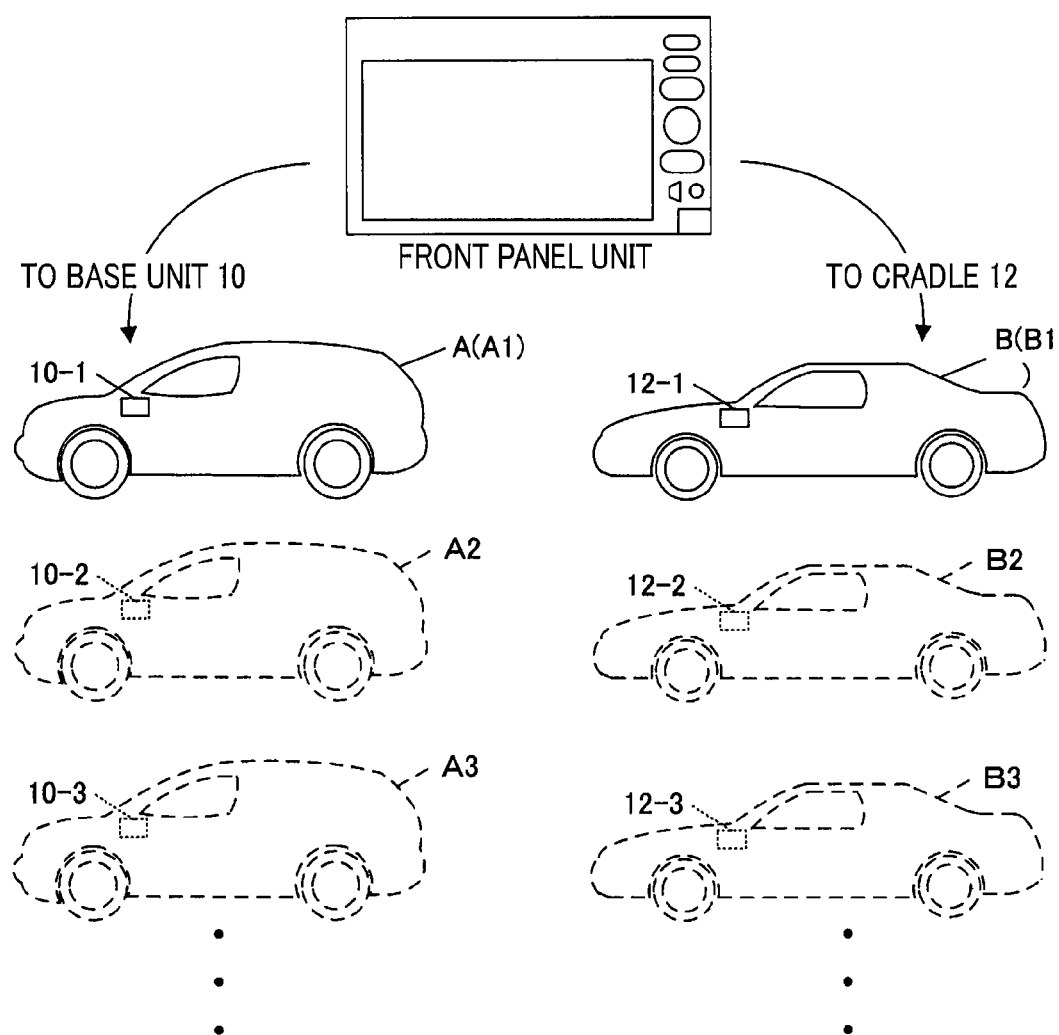
FIG. 4 illustrates how the base unit shown in FIG. 1 is mounted to a vehicle.
Figure 5:
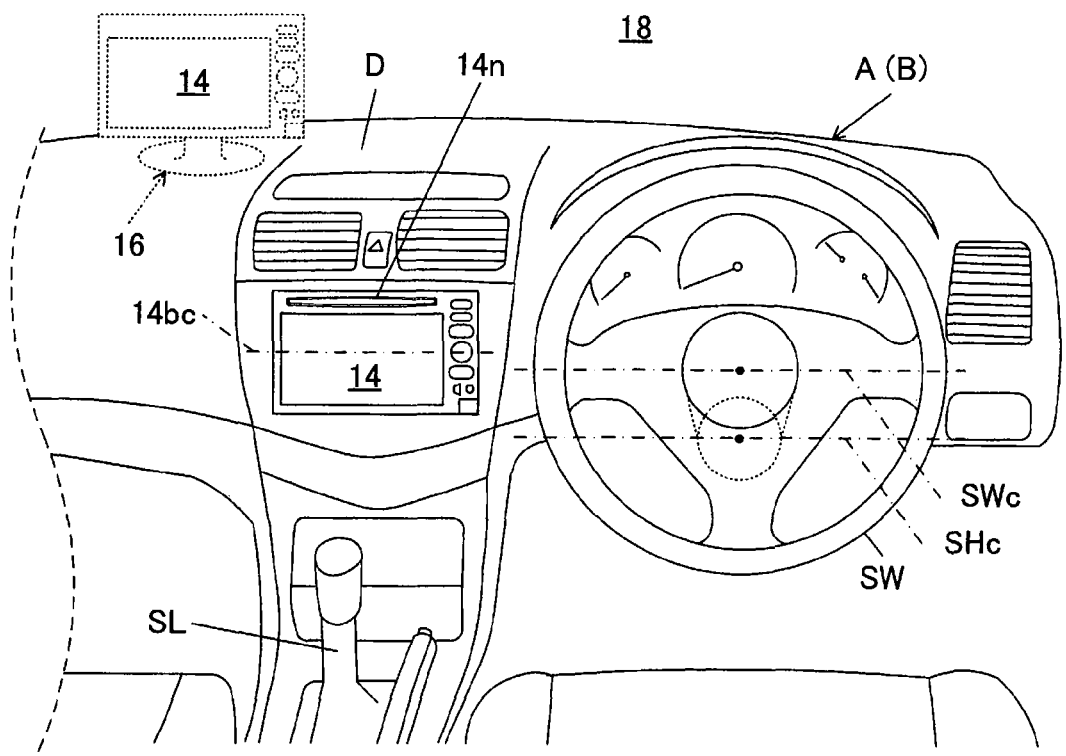
FIG. 5 illustrates a driver's seat in the vehicle shown in FIG. 4.
Figure 5:
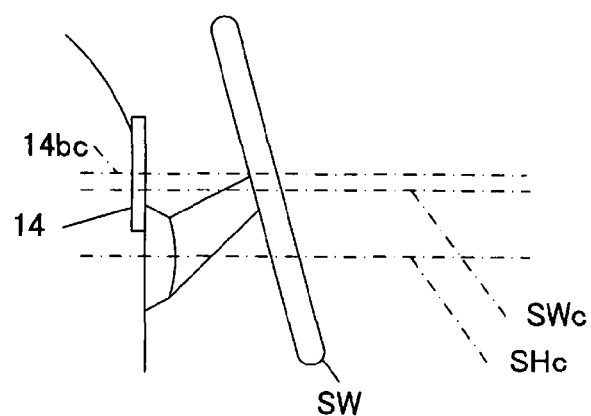

FIG. 1 is a perspective view, as seen from the front, of a base unit, which constitutes a base portion of a navigation device, and a front panel unit, which constitutes a display portion attachable to and detachable from the base portion, according to a first embodiment. FIG. 2 is a perspective view, as seen from the back, of the front panel unit. FIG. 3 is a perspective view of (the back side of) the front panel unit, a cradle unit, and a cradle unit mounting arm. FIG. 4 illustrates the mounted state thereof. FIG. 5 illustrates a driver's seat and its surroundings in a vehicle.

As shown in FIGS. 1-3, the navigation device according to the present embodiment includes: a base unit 10, which is secured to or built in (or, fastenable to) the dashboard of a vehicle A, and which is supplied with operating power from a power supply (or, battery) of the vehicle A; a cradle unit 12, which is secured to (or, fastenable to) the dashboard of a vehicle B, and which is supplied with operating power from a power supply (or, battery) of the vehicle B; and a front panel unit 14, which is attachable to and detachable from the base unit 10 or the cradle unit 12. In this case, the vehicles A and B are both automobiles.

The base unit 10 and the cradle unit 12 each constitute the base portion according to the present invention. As will be described later, the units 10 and 12 each include electronic circuits such as an EEPROM, AM/FM/TV tuners, a DVD recording and reproducing device, and the like. The units 10 and 12 are each connected with electrical apparatuses installed in the vehicle, such as a GPS device, a vehicle speed detecting device, a transmission switch, an external antenna for tuner, an ETC device, and the like.

The front panel unit 14, as will be described later, includes a liquid crystal panel, and also includes a navigation microcomputer, a RAM, a FLASH, a Bluetooth module, a memory card, a wireless module, and the like. The front panel unit 14 constitutes the display portion according to the present invention.

In the navigation device according to the present embodiment, basically, the base unit 10 and the front panel unit 14 are combined, although the front panel unit 14 may be attached to the cradle unit 12 in a practical application. As shown in FIG. 4, base units 10-1, 10-2, 10-3, . . . , or cradle units 12-1, 12-2, 12-3, . . . , may be configured to be attachable to and detachable from the corresponding vehicles A1, A2, A3, . . . , or vehicles B1, B2, B3, . . . . Further, each user may set the screen settings of the front panel unit 14 for the user him/herself in advance, to use the settings by switching them in accordance with the ID number of the base unit 10 or the cradle unit 12 of each vehicle. This can improve the convenience of the device.

The base unit 10 includes a case 10a which has a box shape as a whole. The case contains, among others, a substrate on which a microcomputer and others are mounted, the microcomputer enabling operation of audio equipment in the vehicle A. The front face of the case 10a is formed into the 2DIN (Deutsche Industrie Norm) size, and has a recess 10b formed therein.

The front panel unit 14 includes a plate-shaped case 14a which has a size approximately the same as or slightly greater than that of the front face of the base unit 10. The case 14a has a front face that is provided with a liquid crystal panel (or, display) 14b for displaying map data. Also provided on the front face are switches, which are operable by a user (or, operator), including a destination input switch 14c, a current location input switch 14d, and the like, and jacks 14e and 14f for connecting "i-pod" (registered trademark) and audio equipment thereto. The liquid crystal panel 14b includes a touch panel which can detect the position touched by a user (or, operator). The touch panel will be described later.

The front panel unit 14 is configured to be attachable to and detachable from the recess 10b of the base unit 10. Hereinafter, the attaching/detaching operations will be described.

Firstly, for attachment, on the back surface of the front panel unit 14, fixed claws 14g are formed on the left side and movable catch levers 14h are arranged on the right side, as shown in FIG. 2. In the recess 10b of the base unit 10, movable lock levers 10c are arranged on the right side and fixed claws 10d are formed on the left side, which engage with the fixed claws 14g and the catch levers 14h, respectively, of the front panel unit 14 when the front panel unit 14 is attached.

As shown in FIG. 1, a connector 10e is provided in the recess 10b of the base unit 10. When the front panel unit 14 is attached to the base unit 10, the front panel unit 14 is supplied with operating power from the power supply (or, battery) of the vehicle A via the connector 10e, and also transmits and receives data and control signals to and from various sensors, including a GPS signal receiver 20, and AV equipment. Of the electric contacts of the connector 10e, the left and right ones constitute ground contacts.

Detachment will now be described. The front panel unit 14 is provided with a detach button 14i, which is arranged beneath the jacks 14e and 14f. In the state where the front panel unit 14 is attached to the base unit 10, when a user presses the detach button 14i, its movement is transmitted to the lock levers 10c via a detach knob 10f arranged on the base unit 10, whereby the lock levers 10c are moved outward, so as to be disengaged from the fixed claws.

The catch levers 14h, arranged on the left side of the front panel unit 14, are only urged outward (to the right in FIG. 2) by spring force to be engaged with the fixed claws 10d in the base unit 10. Thus, when the left side is opened and the front panel unit 14 is slightly moved rightward (in FIG. 1) by the user, the engagement with the base unit 10 is released, allowing the front panel unit 14 to be detached from the base unit 10.

As shown in FIG. 1, a release lever 10g is arranged in the recess 10b at the front face of the base unit 10. When the front panel unit 14 is attached via a kick lever loaded with a spring (both not shown), the release lever 10g is urged in the direction to push out the front panel unit 14. The release lever 10g is provided with a panel unit detection switch (not shown), which generates an output in accordance with the position of the release lever 10g (i.e. in accordance with the attachment/detachment of the front panel unit 14). For example, the switch generates an ON signal when the front panel unit 14 is attached and an OFF signal when the same is detached.

As shown in FIGS. 2 and 3, the cradle unit 12 is detachably attached to the back face of the front panel unit 14. Although the mechanism for attaching/detaching the front panel unit 14 to/from the cradle unit 12 is not shown, the front panel unit 14 described with reference to FIG. 1 is removably attached to the cradle unit 12 via base catch levers and others. The cradle unit 12 is also provided with a panel unit detection switch.

The cradle unit 12 is fastened to the dashboard of the vehicle B via a cradle unit mounting arm 16. The cradle unit 12 is provided with a case 12a which is smaller in height than and greater in depth than the case 14a of the front panel unit 14. The case 12a contains, among others, a substrate on which a microcomputer and others are mounted.

As shown in FIG. 5, the front panel unit 14 is arranged near the driver's seat in the vehicle A or B. For example, the front panel unit 14 is attached to the base unit 10, which is built in the dashboard, or arranged on the dashboard via the cradle unit 12. In either case, the front panel unit 14 is arranged at a height close to that of a windshield 18.

More specifically, in the case where the front panel unit 14 is attached to the base unit 10, the front panel unit 14 is arranged in a position where, as seen from a user (of an average sitting height), the center line 14bc in the longitudinal direction of the liquid crystal panel of the front panel unit 14 is slightly higher than a horizontal plane SWc passing the center of rotation of a steering wheel SW and considerably higher than a horizontal plane SHc passing a steering shaft at the lower end plane position of the dashboard (approximately the front plane position of the front panel unit 14). That is, the horizontal plane SHc is located closer to the bottom surface of the front panel unit 14. In the figure, SL denotes a transmission shift lever.

As described above, in the navigation device according to the present embodiment, the front panel unit 14 is configured to be attachable to and detachable from the base unit 10 or the cradle unit 12. In addition, an authentication unit 30 (FIG. 6A) is provided, which performs authentication to confirm that the front panel unit 14 has been connected to the base unit 10 or the cradle unit 12, in accordance with connection of connectors or authentication codes as will be described later, and, when the connection is confirmed, permits operation of an electrical control unit of the vehicle.

Figure 6A:
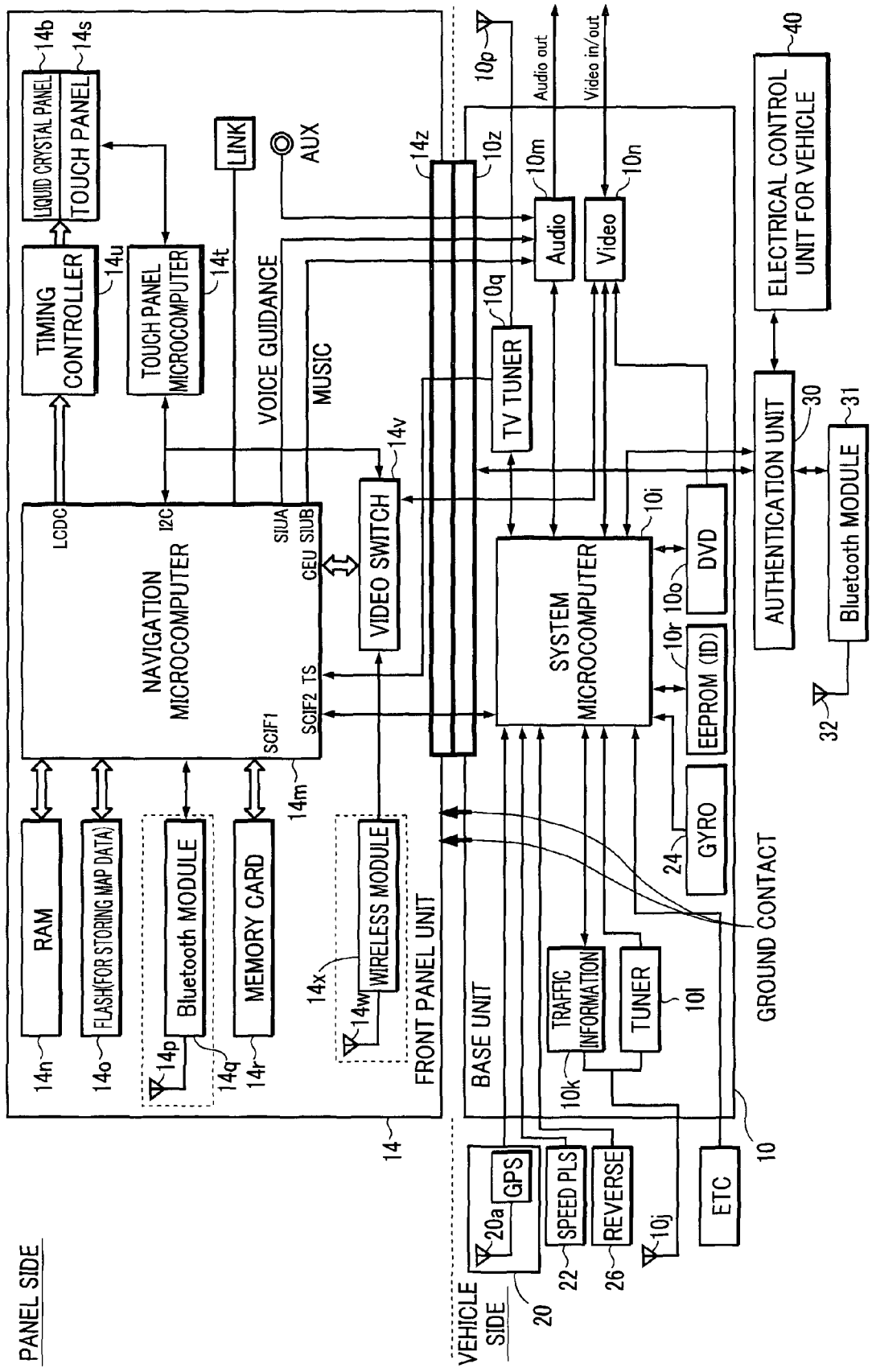
FIG. 6A is a block diagram showing the internal configurations of the front panel unit and the base unit.

FIG. 6A is a block diagram showing the internal configurations of the front panel unit 14 and the base unit 10, and FIG. 6B is a block diagram showing the internal configurations of the front panel unit 14 and the cradle unit 12.

As shown in FIG. 6A, the front panel unit 14 includes a microcomputer (which is referred to as "navigation microcomputer") 14m, and the base unit 10 includes a microcomputer (which is referred to as "system microcomputer") 10i. Further, as shown in FIG. 6B, the cradle unit 12 includes a microcomputer (which is referred to as "cradle microcomputer") 12b. Here, the throughput of the navigation microcomputer 14m on the front panel side is several times greater than that of the system microcomputer 10i or the cradle microcomputer 12b.

Referring to FIG. 6A, the base unit 10 includes, in addition to the system microcomputer 10i, a traffic information module (a VICS) 10k which receives traffic information via an antenna 10j attached to the vehicle A, a tuner 101 which receives airwaves for vehicle-mounted audio equipment (such as an AM/FM radio, not shown) of the vehicle A, an audio circuit block 10m which controls the operation of the vehicle-mounted audio equipment, a video circuit block 10n which causes video images of a DVD or the like to be displayed on the liquid crystal panel 14b in the front panel unit 14, a DVD module 10o which operates by communicating with the system microcomputer 10i to read video signals from a disk and demodulate the video signals to transmit them as analog signals to the video circuit block 10n, a one-seg (1SEG) TV tuner 10g which receives digital terrestrial broadcasting via an antenna (not shown), an EEPROM 10r which is made up of a non-volatile memory, and a connector 10z for electrical connection with the front panel unit 14 (more specifically, with a connector on the front panel side).

The base unit 10 further includes a gyro sensor (also simply referred to as "gyro") 24, which is connected to the system microcomputer 10i. A global positioning system (GPS) signal receiver (also simply referred to as "GPS") 20 which receives the GPS signals, a wheel speed sensor (also referred to as "SPEED PLS") 22, and a reverse gear switch (also referred to as "REVERSE") 26, which are provided on the vehicle side, are also connected to the system microcomputer 10i. The reverse gear switch 26 is connected to a transmission or the shift lever 30 (FIG. 5) of the transmission.

The GPS signal receiver 20 includes an antenna 20a, which is attached to an appropriate position of the case 10a of the base unit 10 or of the dashboard.

In the case where the front panel unit 14 is detached from the base unit 10 and attached to the cradle unit 12, the one attached to an appropriate position of the case 12a of the cradle unit 12 or of the cradle unit mounting arm 16 is utilized.

The wheel speed sensor 22 is arranged in the vicinity of the driveshaft (not shown) of the vehicle A, and outputs a pulse signal every time the driveshaft, or, the wheel (tire) rotates by a predetermined angle (i.e., it detects the angle of rotation of the wheel of the vehicle A).

The gyro sensor 24 is arranged inside the case 10a of the base unit 10, and generates an output whose voltage varies in accordance with the angular velocity (yaw rate) about the vertical axis at the center of gravity of the vehicle A. That is, the gyro sensor 24 detects the angular velocity (yaw rate) about the vertical axis of the vehicle A.

Further, in order for the gyro sensor 24 to receive vibration similar to that received by the vehicle A, the gyro sensor 24 is arranged on a suitable substrate inside the case 10a, close to the edge portion. Furthermore, as the attachment angle will affect the sensitivity of the gyro sensor 24, the attachment angle is measured after the gyro sensor 24 is attached to the vehicle A, and the measured angle is stored in the EEPROM 10r.

The reverse gear switch 26 is arranged at an appropriate position of the transmission (not shown) or the shift lever 30 (FIG. 5) of the vehicle A. The reverse gear switch 26 outputs an ON signal in the case where a reverse gear for backing up the vehicle A is engaged (turned on), or in the case where the shift lever 30 is in the R position, i.e., the vehicle A is about to back up.

The front panel unit 14 includes, in addition to the navigation microcomputer 14m, a RAM 14n, a FLASH memory 14o for storing map data for navigation and the like, a BT (Bluetooth) module 14q which transmits and receives radio waves of 2.45 GHz to and from a mobile phone hands-free microphone via an antenna 14p attached to the case 14a, a memory card 14r, a touch panel 14s arranged on the liquid crystal panel 14b, a touch panel microcomputer 14t for controlling the operation of the touch panel, a timing controller 14u which generates various synchronous signals for liquid crystal display, a video switch 14v which controls input/output of the video circuit block 10n of the base unit 10 and others, a wireless module 14x which receives image data from a rear camera in the form of radio waves of the similar frequency band via an antenna 14w attached to the case 14a, and a connector 14z for electrical connection with the base unit 10 (more specifically, with the connector 10z on the base unit side).

The BT module (short-range transceiver module) 14q and the wireless module (dedicated image data receiving module) 14x are arranged, e.g., on the back surface of the case 14a.

In the configuration shown in FIG. 6A, the receiver 20 which receives the GPS signals on the vehicle side is arranged on the side of the base unit 10. The location information acquired from the GPS signals and the outputs from the wheel speed sensor 22, the gyro sensor 24, and the reverse gear switch 26 are sorted and integrated in the system microcomputer 10i before being transmitted to the navigation microcomputer 14m.

The navigation microcomputer 14m firstly acquires the location of the vehicle A on the basis of the GPS signals, and then corrects the location on the basis of the outputs from the wheel speed sensor 22 and the gyro sensor 24. As such, the navigation microcomputer 14m determines the location of the vehicle A by autonomous navigation. The vehicle's location determined by the autonomous navigation is stored in the FLASH memory 14o and/or the EEPROM 10r at regular intervals, so that the current location of the vehicle A can be estimated immediately after the engine of the vehicle A is started and power is turned on.

Low-speed digital signals are transmitted between the system microcomputer 10i and the navigation microcomputer 14m over a signal line (or, serial data line), while the video signals input via the one-seg TV tuner 10g are transmitted as high-speed digital signals to the front panel unit 14 over another data line.

The video signals input from the DVD module or from the outside are input into the video circuit block 10n in the base unit 10, and thereafter, transmitted as analog signals to the video switch 14v in the front panel unit 14 over a signal line. The video switch 14v transmits its output as a digital signal to the navigation microcomputer 14m, and receives a control signal from the navigation microcomputer 14m. Furthermore, it may be configured such that the image signals from the wireless module 14x are transmitted to the video circuit block 10n via the video switch 14v, so as to be transmitted from an external terminal to another video device for viewing or recording.

The internal configuration of the cradle unit 12 will now be described with reference to FIG. 6B.

The cradle unit 12 includes, in addition to the cradle microcomputer 12b, an audio circuit block 12c which controls audio input and output to and from a speaker arranged in the cradle unit 12, an FM transmitter 12e which transmits an output of an audio module via an antenna 12d in the form of radio waves, an EEPROM 12f which is made up of a nonvolatile memory, a one-seg (1SEG) TV tuner 12h which receives the digital terrestrial broadcasting via an antenna 12g, and a connector 12z for electrical connection with the front panel unit 14 (more specifically, with the connector 14z on the front panel side).

It is noted that, in the case where the front panel unit 14 is detached from the base unit 10 and attached to the cradle unit 12, as described above, the antenna 20a of the GPS signal receiver 20 included in the vehicle B is used.

The cradle microcomputer 12b transmits the location information obtained from the GPS signals to the navigation microcomputer 14m in the front panel unit 14. The navigation microcomputer 14m in turn determines the location of the vehicle B on the basis of the GPS signals alone.

According to the present invention, the navigation device includes the authentication unit which will now be described.

In the embodiment shown in FIG. 6A, in order to detect connection between the connector 10z of the base unit 10 and the connector 14z of the front panel unit 14 and/or detachment of the front panel unit 14 from the base unit 10, the authentication unit 30 is electrically connected to the connector 10z of the base unit 10 and also connected to the system microcomputer 10i.

When the base unit 10 and the front panel unit 14 are connected with each other, the authentication unit 30 performs authentication in response to an electric signal from the connector 10z, and when the connection between the base unit 10 and the front panel unit 14 is confirmed, the authentication unit 30 outputs a signal permitting operation of an electrical control unit 40 of the vehicle. This signal is supplied to the electrical control unit 40, and is also transmitted to an external device such as a mobile phone via a communication device including a BT (Bluetooth) module 31 and an antenna 32.

The vehicle's electrical control unit 40 includes electric circuits which each control a prescribed object, including an ignition circuit, an immobilizer device, a fuel injection device, and the like, a processor which stores operation programs for vehicle-mounted devices, and other hardware.

The authentication unit 30 may be connected to the connectors 10z, 12z, and 14z which electrically connect the base unit 10 or the cradle unit 12, constituting the base portion as described above, with the front panel unit 14, constituting the display portion, and may also be connected to a ground contact. The authentication unit 30 is capable of readily performing authentication by detecting the connection of the connectors or the state of a switch which detects attachment/detachment of the front panel unit 14.

For further enhancement of the authentication accuracy, the authentication unit 30 is configured to use an authentication code recorded on a memory (FLASH memory 14o) built in the front panel unit 14 and an authentication code recorded on a memory (such as the EEPROM 10r or 12f) included in the base unit 10, the cradle unit 12, or the vehicle, to perform authentication in accordance with an authentication program installed in the authentication unit 30.

In this case, the authentication code is provided for each of the base unit 10, the cradle unit 12, and the front panel unit 14, and the authentication codes may be transmitted and received via the connection between the connector 14z and the connector 10z or 12z, which electrically connects the front panel unit 14 with the base unit 10 or the cradle unit 12 as described above, or via the communication device such as the BT module 31.

For the authentication code, for example, a vehicle-specific code stored in a memory included in the vehicle, or a key code stored in a memory included in the front panel unit 14, may be used.

Herein, the authentication on the basis of the authentication codes may be performed using, e.g., the method that is executed in the authentication device disclosed in Japanese Patent Application Laid-Open No. 2001-65209.

According to the method, a transmitter transmits a variable code in response to depression of a send button. In response to continuous depression of the send button over a predetermined number of cycles, the transmitter transmits an identification code specific to the transmitter together with the variable code. When receiving a variable code from the transmitter, a receiver compares the received code with a variable code stored in a storage means to thereby conduct first determination as to whether the codes are in a predetermined relationship. When receiving the identification code together with the variable code from the transmitter, the receiver compares the received identification code with an identification code stored in a storage means to thereby conduct second determination as to whether the codes match each other. If "yes" in the first determination, the variable code in the storage device is overwritten by the received variable code. If "no" in the first determination and "yes" in the second determination, prescribed processing is carried out.

In the case of using the above-described authentication method, the authentication unit 30 performs authentication by confirming that the front panel unit 14 has been connected to the base unit 10 or the cradle unit 12, instead of confirming the send button depressing operation or a change of date, and when the above is confirmed, enables operation of the electrical control unit of the vehicle.

In the case where the authentication is performed using the authentication codes as described above, the authentication unit 30 is provided with the functions of performing, in addition to the authentication process as will be described below, the process of modifying (deleting or adding) the authentication code and the process of adding the authentication code for transmission.

In this case, the authentication unit 30 may be an authentication program (i.e. software) for performing those processes, or may be hardware such as a processing unit (or, CPU) storing the program therein. In either case, it may be installed in one or both of the system microcomputer 10i of the base unit 10 and the cradle microcomputer 12b of the cradle unit 12, or a dedicated electronic circuit may be provided independently. Furthermore, the authentication code modifying process may be executed by a computer having a cradle unit function which is placed at a dealer or at home.

In the case where the processing of the authentication unit 30 is executed in a computer, the processes illustrated in the flowcharts in FIGS. 6C to 6F described below are performed by interrupt processing (FIG. 25) which will be described later.

Hereinafter, the processing executed by the authentication unit 30 will be described.

Figure 6C:
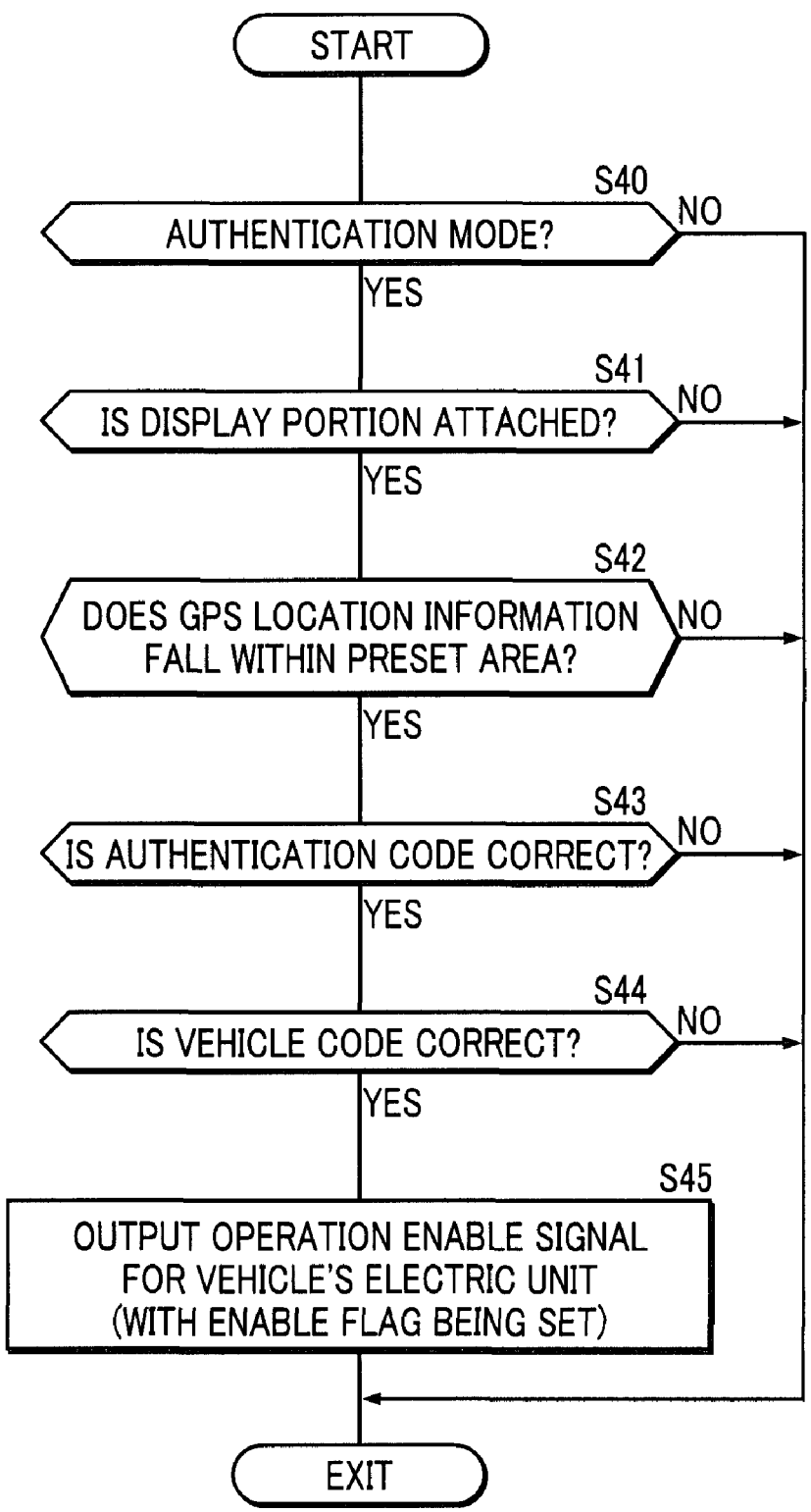
FIG. 6C is a flowchart illustrating an authentication process performed by an authentication unit.

FIG. 6C is a flowchart illustrating an authentication process.

Firstly, in S40, it is determined whether the device is in an "authentication mode". If so, the process proceeds to S41, where it is determined whether the display portion (the front panel unit 14 in the present embodiment) has been attached. If so, the process proceeds to S42, where it is determined whether the location information according to the GPS falls within an area set in advance. If so, the process proceeds to S43, where it is determined whether the authentication code is correct. If so, the process proceeds to S44, where it is determined whether the vehicle code is correct. If so, the process proceeds to S45, where an operation enable signal for the vehicle's electric unit is transmitted (with an operation enable flag being set), whereby the process is terminated.

On the other hand, if the determination result is NO in each of S40 to S44, the process is terminated.

Figure 6D:
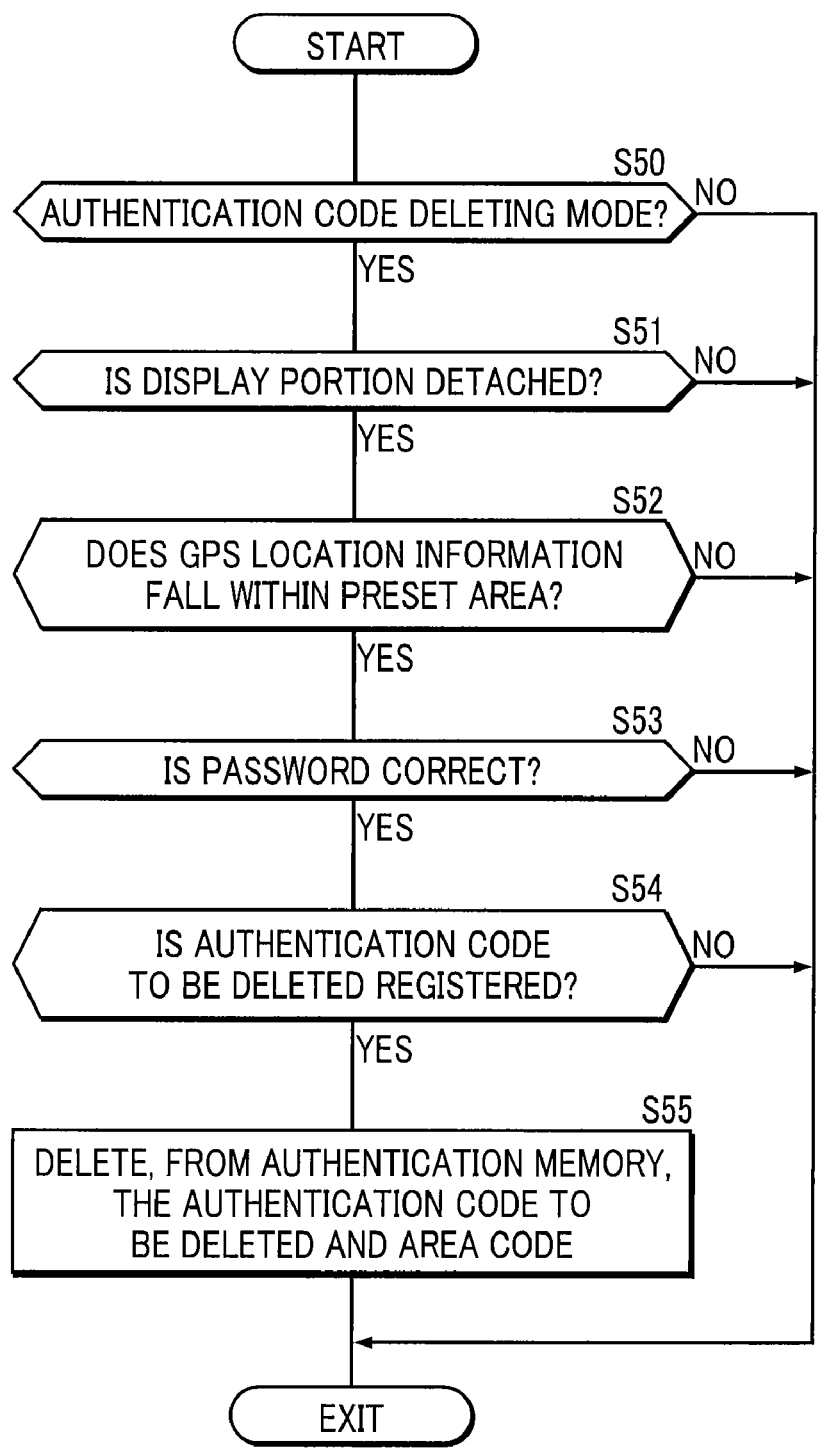
FIG. 6D is a flowchart illustrating an authentication code deleting process.

FIG. 6D is a flowchart illustrating an authentication code deleting process.

Firstly, in S50, it is determined whether the device is in an "authentication code deleting" mode. If so, the process proceeds to S51, where it is determined whether the display portion (the front panel unit 14 in the present embodiment) has been detached. If so, the process proceeds to S52, where it is determined whether the location information according to the GPS falls within a preset area. If so, the process proceeds to S53, where it is determined whether the password (or, the personal identification number) is correct. If so, the process proceeds to S54, where it is determined whether the authentication code to be deleted has been registered. If so, the process proceeds to S55, where the authentication code to be deleted and the area code are deleted from the authentication memory, whereby the process is terminated.

On the other hand, if the determination result is NO in each of S50 to S54, the process is terminated.

Figure 6E:
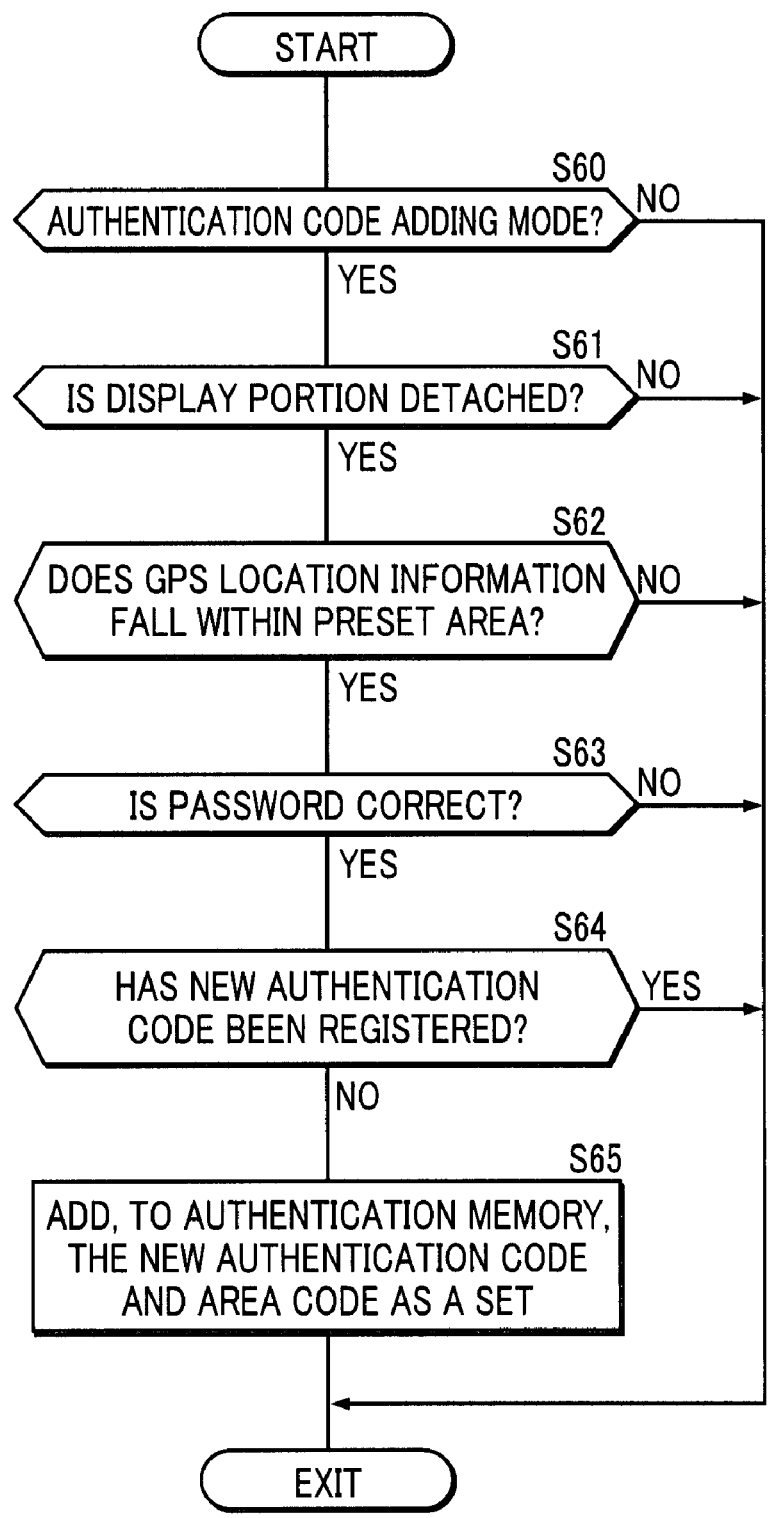
FIG. 6E is a flowchart illustrating an authentication code adding process.

FIG. 6E is a flowchart illustrating an authentication code adding process.

Firstly, in S60, it is determined whether the device is in an "authentication code adding" mode. If so, the process proceeds to S61, where it is determined whether the display portion (the front panel unit 14 in the present embodiment) has been detached. If so, the process proceeds to S62, where it is determined whether the location information according to the GPS falls within a preset area. If so, the process proceeds to S63, where it is determined whether the password (or, the personal identification number) is correct. If so, the process proceeds to S64, where it is determined whether the new authentication code has been registered. If not, the process proceeds to S65, where the new authentication code and the area code are added together to the authentication memory, whereby the process is terminated.

On the other hand, if the determination result is NO in each of S60 to S63, or if the determination result is YES in S64, the process is terminated.

Figure 6F:
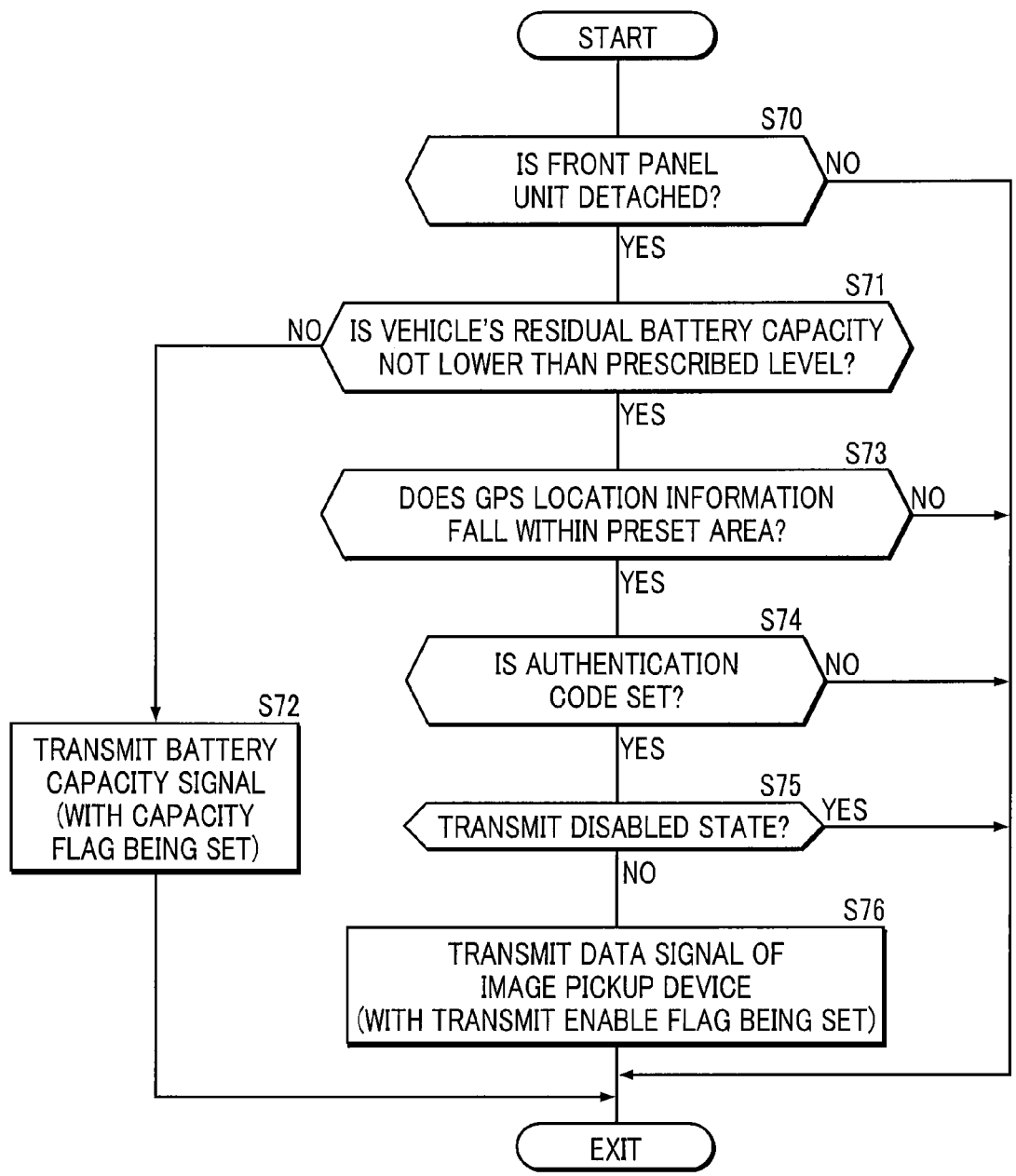
FIG. 6F is a flowchart illustrating a process of adding an authentication code to an image signal obtained from an image pickup device, and transmitting them to the front panel unit in the detached state.

FIG. 6F is a flowchart illustrating a process of adding an authentication code to an image signal obtained from an image pickup device 51 (FIG. 7), which will be described later, for transmission, in the state where the front panel unit 14 is detached from the base unit 10.

Firstly, in S70, it is determined whether the front panel unit 14 has been detached. This determination is made on the basis of the output from the panel detection switch described above. If YES in S70, the process proceeds to S71, where it is determined whether the vehicle's residual battery capacity is not lower than a predetermined value. If not, the process proceeds to S72, where a battery capacity signal is transmitted (with a battery capacity flag being set), whereby the process is terminated.

If YES in S71, the process proceeds to S73, where it is determined whether the location information according to the GPS falls within a preset area. If so, the process proceeds to S74, where it is determined whether an authentication code has been set. If so, the process proceeds to S75, where it is determined whether it is in a "transmit disabled state". If not, the process proceeds to S76, where a data signal from the image pickup device 51, which will be described later, is transmitted (with a transmit enable flag being set), whereby the process is terminated.

On the other hand, if NO in S70, NO in S73, NO in S74, or YES in S75, the process is terminated.

In the present embodiment, the authentication is performed using the authentication codes as described above so as to ensure a high security effect, although the authentication may be performed using only the connection of the connectors described above.

Figure 7:
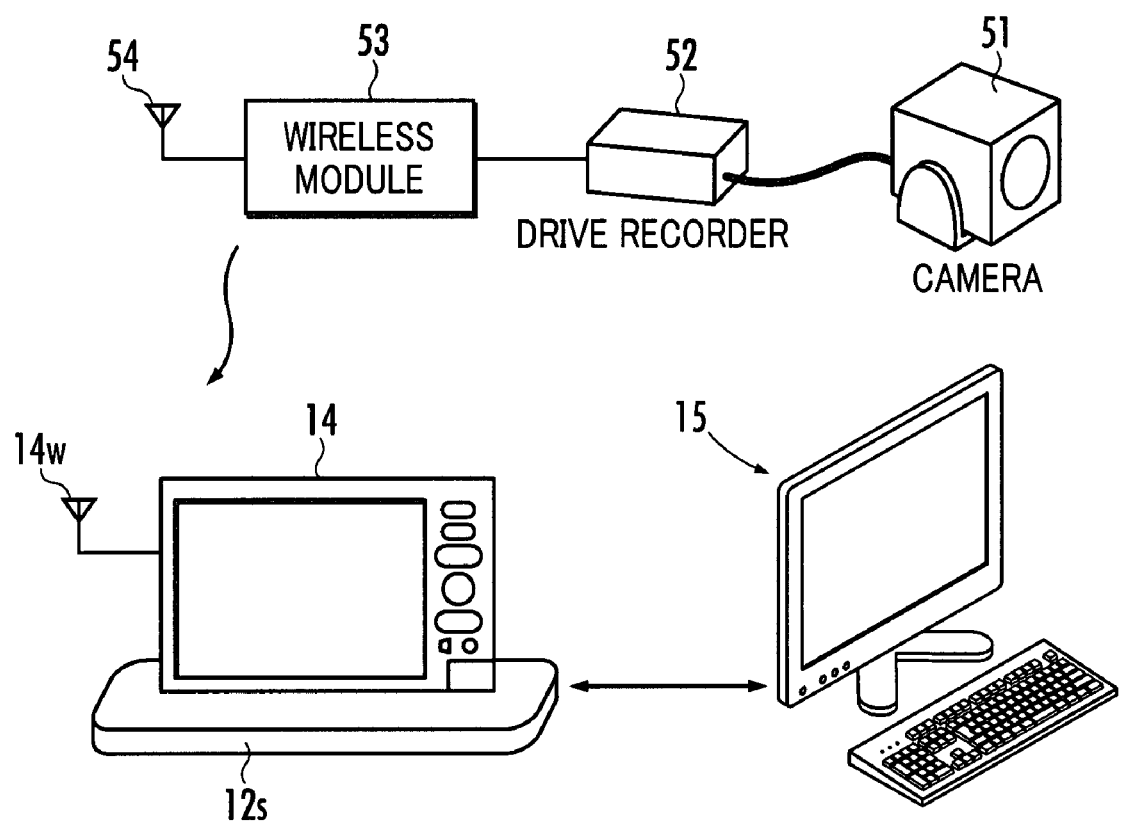
FIG. 7 shows a configuration for transmitting the image signal from the image pickup device to the front panel unit.

Referring now to FIG. 7, the vehicle mounted with the navigation device of the present embodiment includes: an image pickup device 51 for monitoring the inside and outside of the vehicle, such as a monitoring digital camera, and a drive recorder 52 for recording the picked-up images, scenes of accidents, and the like. The images picked up by the image pickup device 51 are recorded on the drive recorder 52, and may also be transmitted from a transmitter, which is composed of a wireless module 53 and an antenna 54 and is connected to the drive recorder 52, to the front panel unit 14 that has been detached from the base unit 10 on the vehicle side, with the authentication code being added to the image signal as described above (FIG. 6F).

The above-described configuration of transmitting the image signal obtained from the image pickup device installed in the vehicle to the display portion (the front panel unit) detached from the base portion enables the inside, outside, and surroundings of the vehicle to be monitored using the front panel unit taken into the house, for example. Particularly, the camera and the drive recorder already installed in the vehicle are used, eliminating the need to newly provide a security camera or monitor. The effects of preventing or deterring theft can be expected, and at the same time, by adding the authentication code, confidentiality of monitoring information can readily be guaranteed.

In the present embodiment, the image pickup device 51 may be an accident recording camera, a side-view camera, a back monitor camera, or a 360-degree camera, using a CCD, CMOS, or other digital image pickup element.

Further, the image pickup device (digital camera) including the digital image pickup element and a processing unit (CPU) for processing the images is provided with a face recognition function (software) known to the public. When the image pickup device recognizes a human face image in the state where the front panel unit 14 is detached, the device records the image in higher precision for transmission.

According to the image pickup device as described above, the image signal transmitted from the vehicle mounted with this device can be used to determine that a large object such as a vehicle or a human being is approaching or has passed by. Furthermore, the image pickup device may be configured to allow a user to select one of two transmission modes, one for transmitting changes of images including the images before and after the determination, and the other for transmitting the picked-up images constantly.

Further, setting and modification of the authentication code for the front panel unit 14 may be carried out in the state where the front panel unit 14 is attached to the cradle unit 12s set in a shop or a dealer, as shown in FIG. 7. Specifically, when the front panel unit 14 is attached to the cradle unit 12s, the front panel unit 14 is powered on and electrically connected to a personal computer 15, allowing a user to set or modify the authentication code by operating the personal computer 15.

Figure 8:
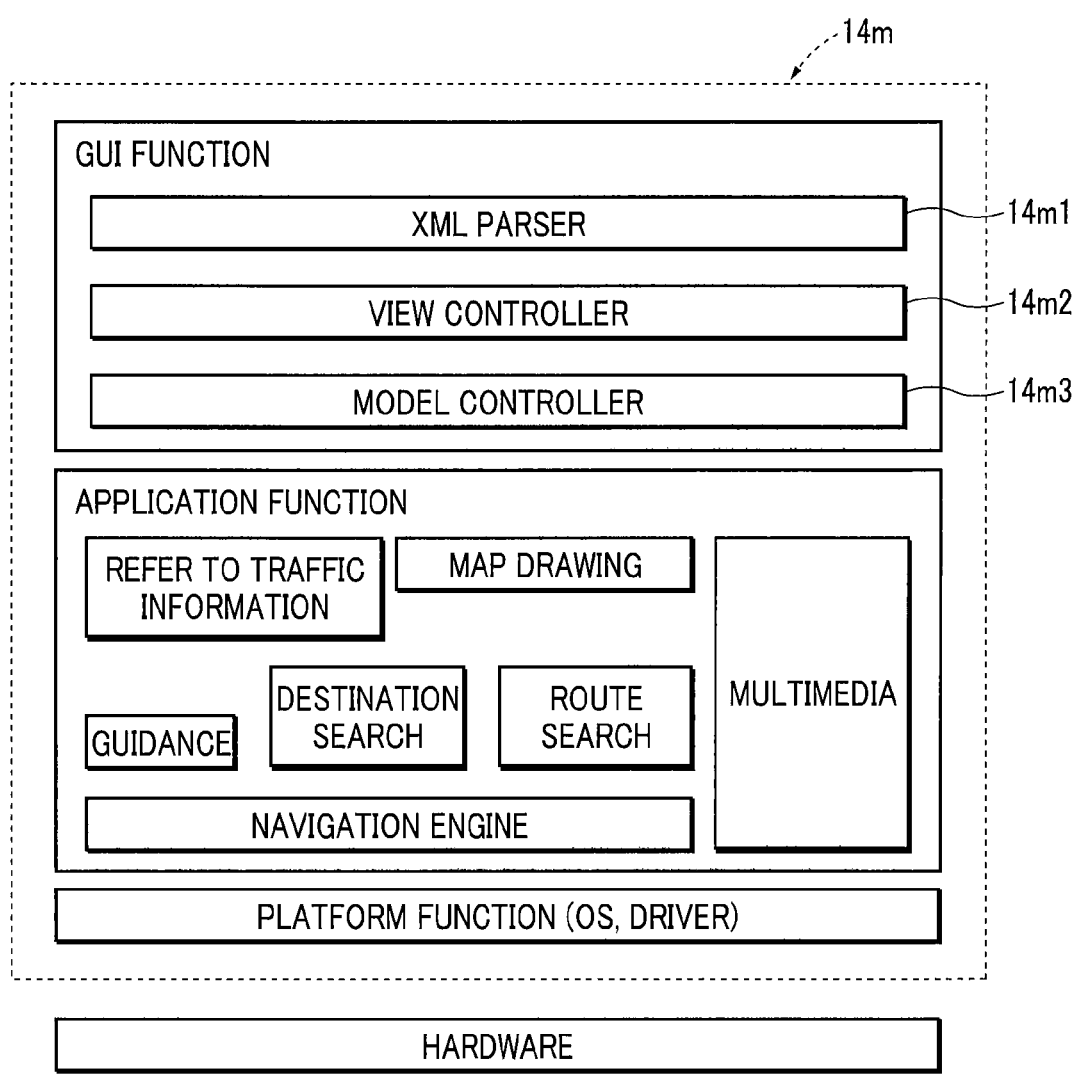
FIG. 8 is a block diagram showing the software configuration of a navigation microcomputer.
Figure 9:
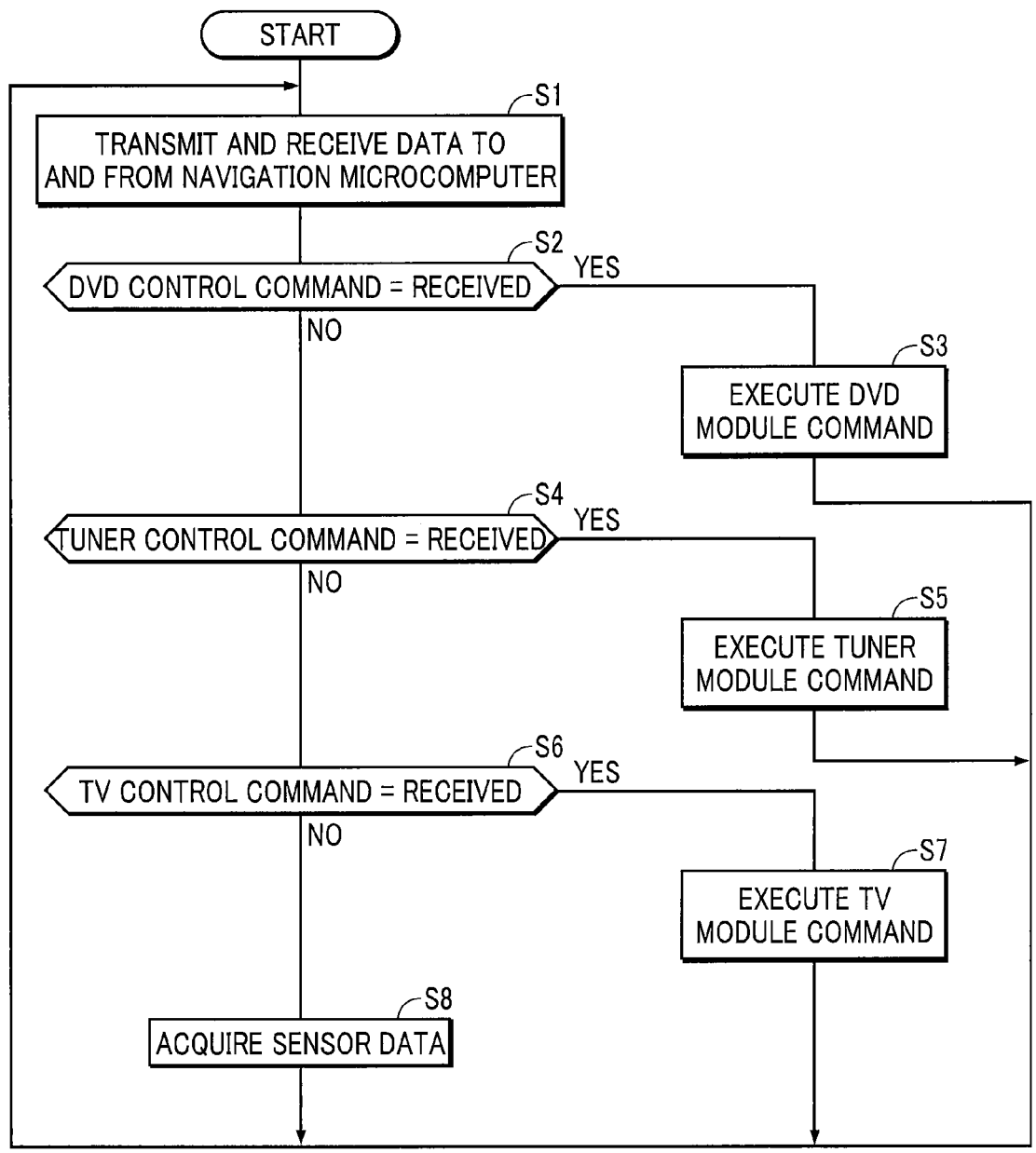
FIG. 9 is a flowchart illustrating processing operations of a system microcomputer.

Now, regarding the navigation microcomputer 14m and the system microcomputer 10i shown in FIG. 6A, FIG. 8 shows the software configuration of the navigation microcomputer 14m, and FIG. 9 shows the software configuration of the system microcomputer 10i.

In the case of operating a device provided with a large number of functions and thus requiring various settings, like the above-described navigation device, use of a graphical user interface (hereinafter, referred to as "GUI") allows a user to visually understand how to operate the device.

Taking this into consideration, in the navigation device according to the present embodiment, a configuration enabling customization of the GUI is incorporated into the navigation microcomputer 14m in the front panel unit 14 shown in FIG. 6A, to allow a user to execute the functions by operating the touch panel 14s.

More specifically, as shown in FIG. 8, the navigation microcomputer 14m of the front panel unit 14 is provided with: a GUI function for displaying a menu on the liquid crystal panel 14b to prompt a user to touch the touch panel 14s, and executing the function designated by the user; a function (i.e. application function) for executing an operation selected by the GUI function; a function (i.e. platform function) for specifying the processing times for various functions and managing memory space; and a function (i.e. driver) for accessing peripheral devices (i.e. hardware). The GUI function is composed of an XML parser 14m1, a VIEW controller 14m2, and a MODEL controller 14m3.

The navigation microcomputer 14m, as described above, supplies tuner and disk drive control commands to the system microcomputer 10i in the base unit 10 over a signal line (i.e. the serial data line).

On the base unit 10 side, as shown in S1 through S8 in FIG. 9, the system microcomputer 10i receives commands from the navigation microcomputer 14m to control the peripheral devices, and transmits the information received from the devices as well as sensor data to the navigation microcomputer 14m over the serial data line. Although not shown in the figure, the cradle microcomputer 12b in the cradle unit 12 performs the processing similar to that performed by the system microcomputer 10i.

Further, in the front panel unit 14, on the basis of the information received from the system microcomputer 10i or the cradle microcomputer 12b, the navigation microcomputer 14m recognizes the one to which the front panel unit has been attached, and determines whether to use the outputs of three sensors or the output of a single sensor, i.e. the GPS signals, for determination of the vehicle's location. The base unit 10 and the cradle unit 12 are assigned unique ID numbers (or, identification numbers), which are stored in the non-volatile memories, or, the EEPROMs 10q and 12f.

Figure 10:
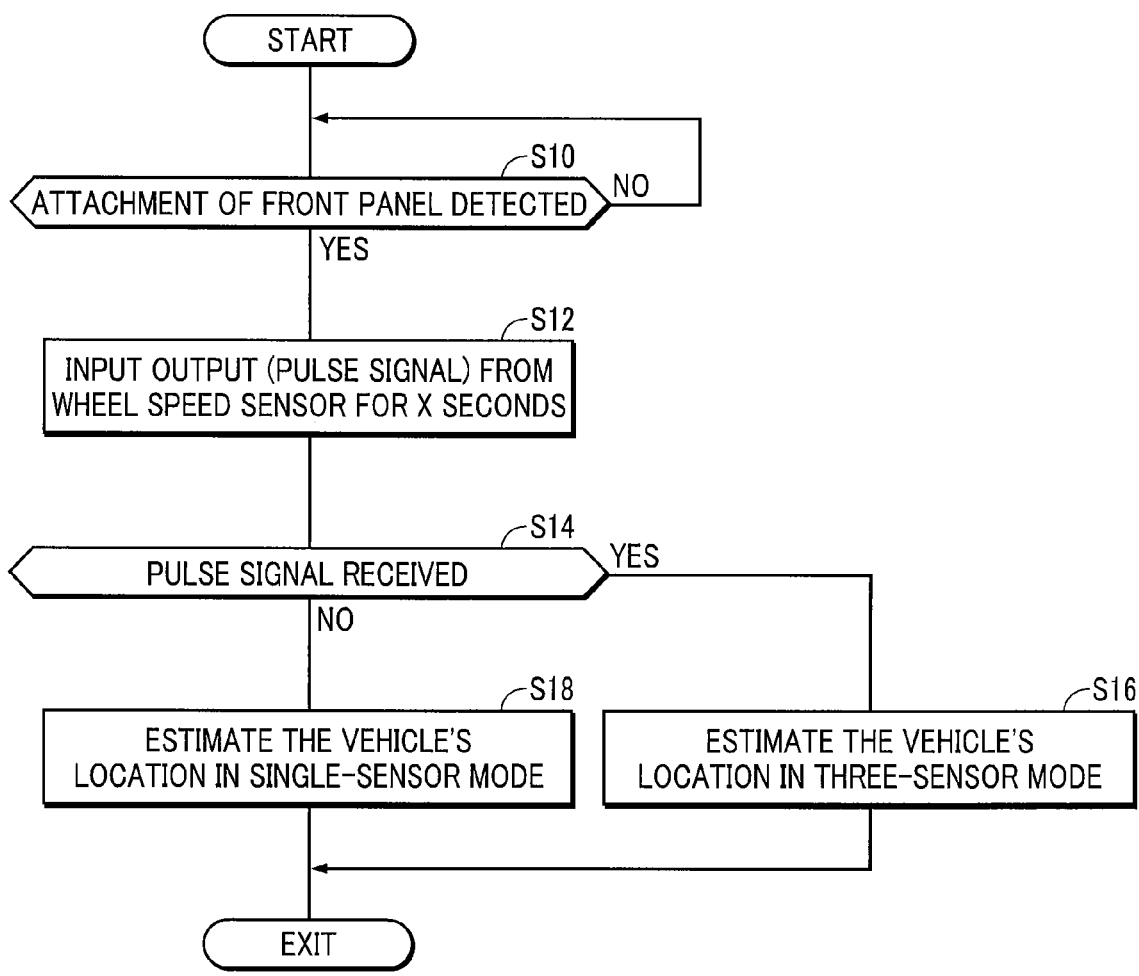
FIG. 10 is a flowchart illustrating a process, executed by the navigation microcomputer, of determining to which one of the base unit and the cradle unit the front panel unit has been attached.

FIG. 10 is a flowchart illustrating the processing performed in the navigation microcomputer 14m.

In S10, it is determined whether attachment of the front panel unit 14 in which the navigation microcomputer 14m is stored has been detected. When the unit 14 is attached, the navigation microcomputer 14m comes to be able to communicate with the system microcomputer 10i or the cradle microcomputer 12b over a signal line, so that the navigation microcomputer 14m can detect the attachment of the own unit.

If YES in S10, the process proceeds to S12, where the output (pulse signal) from wheel speed sensor for X seconds is input. The process then proceeds to S14, where it is determined whether the pulse signal has been received. If so, the process proceeds to S16, where the vehicle's location (of the vehicle A) is determined on the basis of the outputs of three sensors (i.e. the GPS signal receiver 20, the wheel speed sensor 22, and the gyro sensor).

If NO in S14, it means that the front panel unit has been attached to the cradle unit 12. Thus, the process proceeds to S18, where the vehicle's location (of the vehicle B) is determined on the basis of the output (i.e. the GPS signals) of a single sensor (i.e. the GPS signal receiver 20).

For example in the case where the vehicle is caught in a traffic jam, there will be no or almost no output from the wheel speed sensor 22. The sensors to be used for determining the location of the vehicle may be optimally determined and selected in accordance with the output conditions of the sensors, thereby enhancing the accuracy in determination of the location of the vehicle. Further, the flexibility of the use of the detectors for positioning can be improved in the point that the positioning does not necessarily require the use of the three sensors.

In the processing shown in FIG. 10, the determination has been made by receiving the output from the wheel speed sensor 22 for X seconds. Alternatively, it may be configured to determine whether the output of the wheel speed sensor 22 exceeds a predetermined threshold value and select the single-sensor mode if the output does not exceed the threshold value.

Further, in the front panel unit 14, in addition to conducting the processing shown in FIG. 10, the navigation microcomputer 14m recognizes, from the information received from the system microcomputer 10i or the cradle microcomputer 12b, the one to which the own unit has been attached, and determines whether to use the outputs of the three sensors or the output of just one sensor, i.e. the GPS signals, for determination of the location of the vehicle. More specifically, the navigation microcomputer 14m of the front panel unit 14 determines the sensors (detectors) to be used for determining the location of the vehicle in accordance with the attachment state of the front panel unit 14. The base unit 10 and the cradle unit 12 are assigned unique ID numbers (i.e. identification numbers), which are stored in the non-volatile memories (EEPROMs) 10r and 12f.

Figure 11:
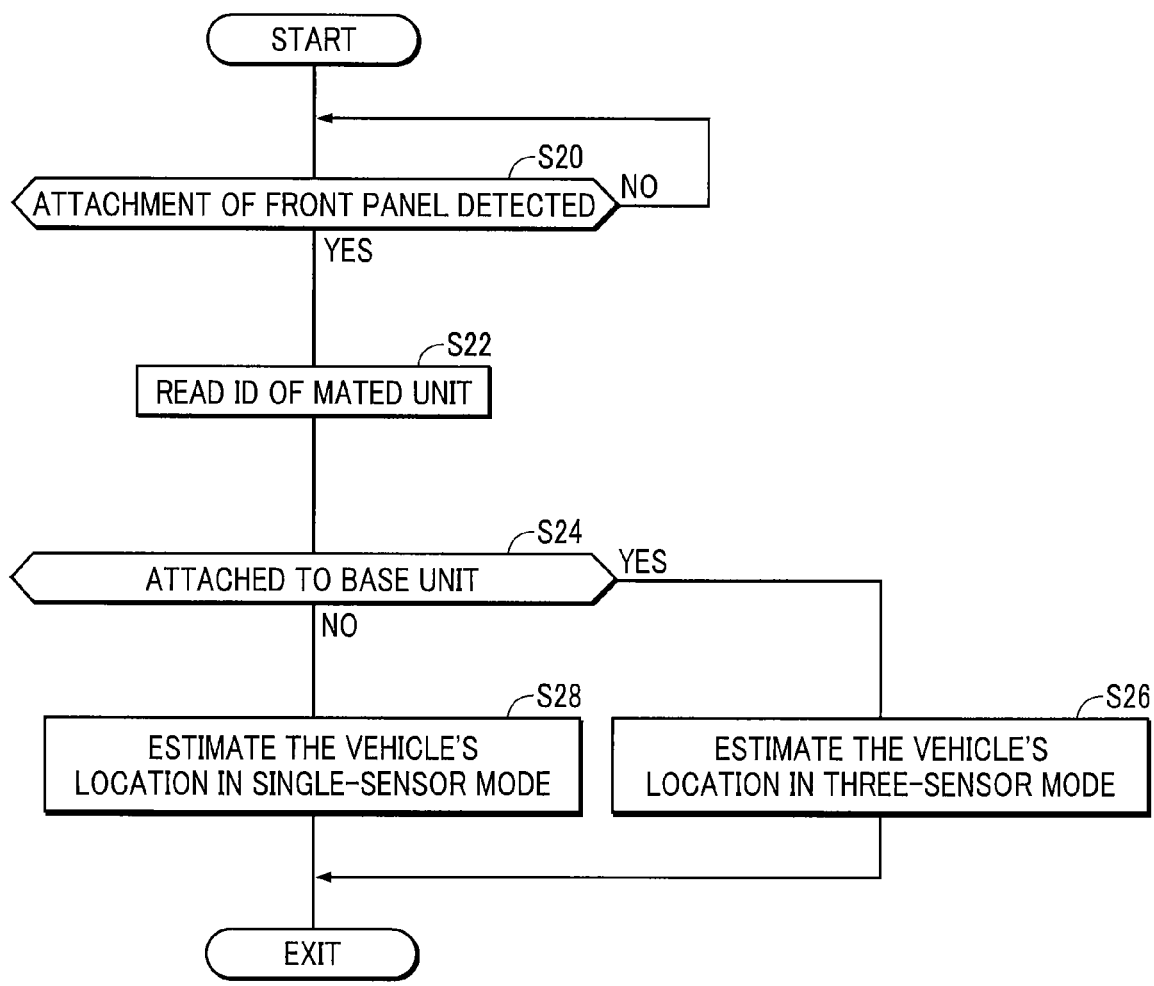
FIG. 11 is a flowchart illustrating a process, executed by the navigation microcomputer following the process in FIG. 10, of determining the sensor outputs to be used for determining the location of the vehicle.

FIG. 11 is a flowchart illustrating the processing at that time. This processing is executed by the navigation microcomputer 14m, likewise the processing in FIG. 10.

Firstly, in S20, it is determined whether attachment of the front panel unit 14 has been detected. When the unit 14 is attached, the navigation microcomputer 14m comes to be able to communicate with the system microcomputer 10i or the cradle microcomputer 12b over a signal line, so that the navigation microcomputer 14m can detect the attachment of the own unit.

If YES in S20, the process proceeds to S22, where the ID number (i.e. identification number) of the unit (or, the mated unit) to which the front panel unit has been attached is read. The process then proceeds to S24, where it is determined whether the front panel unit has been attached to the base unit 10. If so, the process proceeds to S26, where the vehicle location estimation is carried out in the three-sensor mode, i.e., the vehicle's location (of the vehicle A) is determined on the basis of the outputs of three sensors (i.e. the GPS signal receiver 20, the wheel speed sensor 22, and the gyro sensor).

If NO in S24, it means that the front panel unit has been attached to the cradle unit 12. Thus, the process proceeds to S28, where the vehicle location estimation is carried out using a single sensor, i.e., the vehicle's location (of the vehicle B) is determined on the basis of the output (i.e. the GPS signals) of the GPS signal receiver 20.

As described above, it is configured such that the sensors to be used for determining the location of the vehicle A or B are determined in accordance with the state of attachment of the front panel unit 14. This can improve the flexibility of the use of the sensors for positioning.

Storage of the vehicle's location as described above will now be described.

As described above, two or more base units 10, e.g. base units 10-1, 10-2, 10-3, . . . , may be provided. In such a case, the location data of the vehicle A that is stored in the nonvolatile memory (the FLASH memory 14o) in the front panel unit 14 may be the data of another vehicle A2, A3, or the like. This means that, after attachment, it may nevertheless be necessary to receive the GPS signals to determine the location for confirmation.

Figure 12:
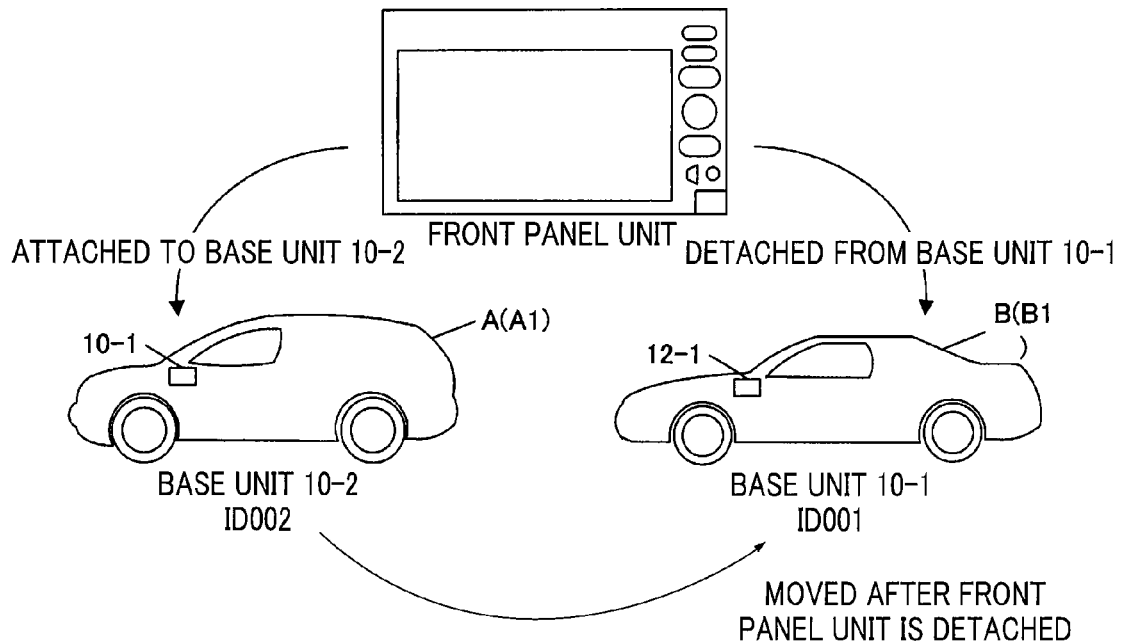
FIG. 12 illustrates location information immediately before detachment, which is stored in a non-volatile memory in the front panel unit together with the ID number of the base unit.

In view of the foregoing, in the navigation device according to the present embodiment, in the case where there are two or more base units 10, as shown in FIG. 12, the location information of the vehicle immediately before detachment is stored, together with the ID number, in the FLASH memory 14o in the front panel unit 14. When the front panel unit 14 is detached from the base unit 10, the front panel unit 14 stores the ID number of the base unit and its location information as a pair, and when the front panel unit 14 is attached to the same base unit again, the front panel unit 14 reads the location information at the time when it was detached, on the basis of the ID number, and uses the read information as the location information. This prevents wrong location information from being used.

Further, irrespective of the number of base units 10 that are present, in the event that the front panel unit 14 is detached from the vehicle A and then attached thereto again after the vehicle A has moved, the current location may be different from the location information stored in the front panel unit 14.

Thus, in the navigation device according to the present embodiment, a flag FLV indicating that the vehicle A has moved while the front panel unit 14 is detached therefrom is provided in the EEPROM 10r in the base unit 10. This processing is executed by the system microcomputer in the base unit 10.

Figure 13:
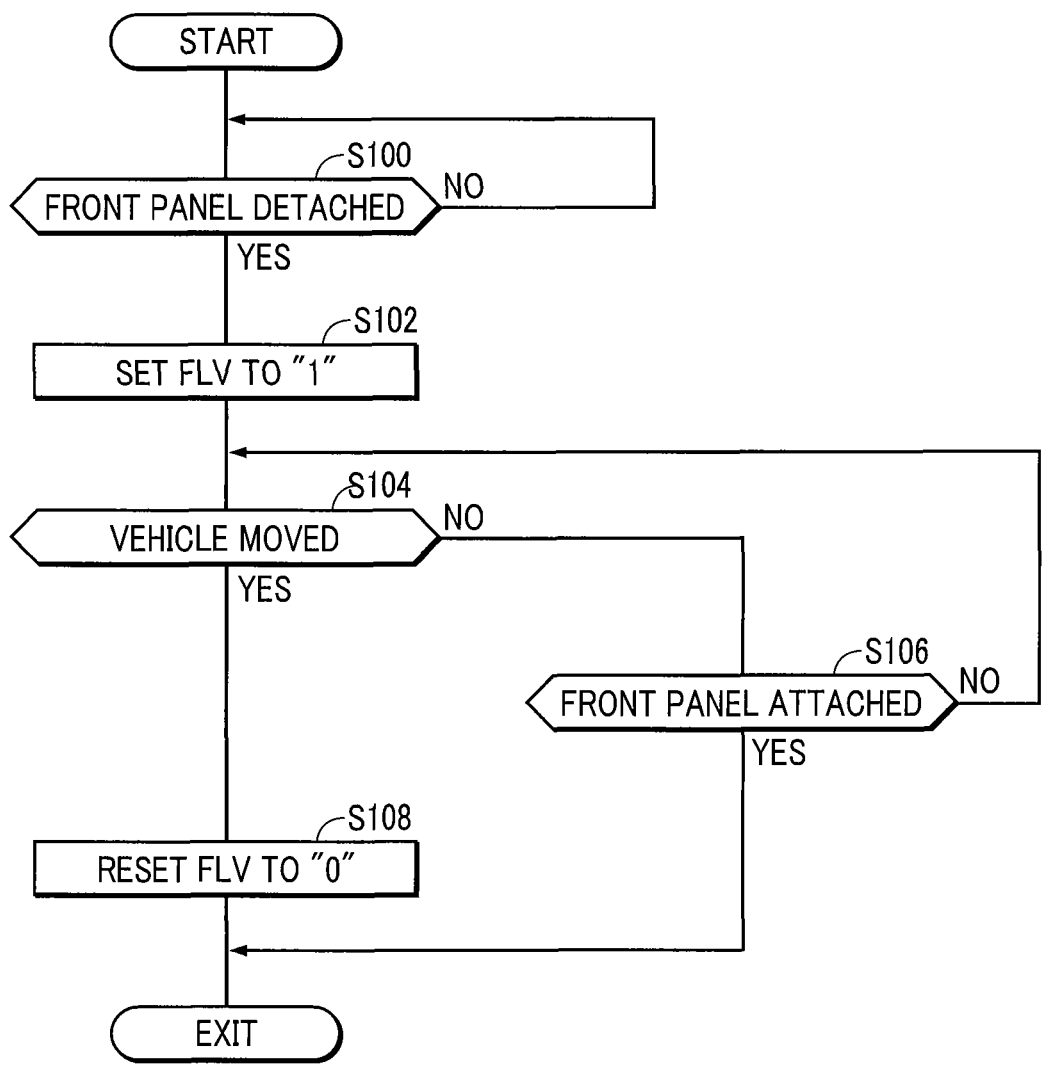
FIG. 13 is a flowchart illustrating a process of determining whether the vehicle has moved while the front panel unit is detached.

FIG. 13 is a flowchart illustrating the determination processing which is executed by the system microcomputer 10i.

Firstly, in S100, it is determined whether the front panel unit 14 has been detached. This determination is made in accordance with the output from the panel detection switch described above. If YES in S100, the process proceeds to S102, where the bit of the flag FLV is set to "1". The process then proceeds to S104, where it is determined whether the vehicle has moved. This determination is made in accordance with the output from the wheel speed sensor 22 described above.

If NO in S104, the process proceeds to S106, where it is determined whether the front panel unit 14 has been attached again. If NO, the process returns to S104. On the other hand, if YES in S104, the process proceeds to S108, where the bit of the flag FLV is reset to "0". If NO in S104 and then YES in S106, the vehicle has not moved, so that S108 is skipped.

FIG. 14 is a flowchart illustrating the processing executed in the navigation microcomputer 14m in response to the processing in the system microcomputer 10i.

Firstly, in S200, it is continuously determined whether the front panel unit 14 has been attached to the base unit 10, on the basis of the output from the panel detection switch described above. If YES in S200, the process proceeds to S202, where the flag FLV stored in the EEPROM 10r in the base unit 10 is read. The process then proceeds to S204, where it is determined whether the bit of the flag FLV is set to "1".

If YES in S204, it means that the vehicle has not moved. The process then proceeds to S206, where it is determined whether a history table (FIG. 12) includes the ID number of the base unit 10 concerned. If YES, the process proceeds to S208, where the location information associated with the ID number concerned is set as the vehicle's location.

On the other hand, if NO in S204, the process proceeds to S210, where the location information stored in the base unit 10 is read. The same applies to the case where NO in S206. The process then proceeds to S212, where it is determined whether the read information is other than "0" data. If YES, the process proceeds to S214, where the read location information is set to the vehicle's location, while if NO, the process proceeds to S216, where a current location setting process is carried out (which will be described below).

That is, after the front panel unit 14 is detached, the system microcomputer 10i of the base unit 10 writes the location information contained in the GPS signals and the information on the orientation of the mounted vehicle into the EEPROM 10r every time the power is turned off. The system microcomputer 10i writes "0" data if the GPS has failed to determine the location.

After the front panel unit 14 is attached to the base unit 10, if the navigation microcomputer 14m in the front panel unit 14 determines, by referring to the flag FLV, that the location information that has been stored cannot be used, the navigation microcomputer 14m reads the location information stored in the base unit 10, and if it is not "0" data, the navigation microcomputer 14m uses that information as the vehicle's location (S204, S210, S212, and S214). As a result, even in the case where the front panel unit 14 was detached from the vehicle and is attached again after the vehicle has moved, it is able to function as the navigation device that can display the vehicle's location.

In the case where the vehicle is parked underground, for example, the GPS signals cannot be obtained even if the front panel unit 14 is attached, in which case the vehicle's location inevitably becomes "0" data. If the vehicle's location is lost, it is not possible to calculate a route to the destination or estimate the arrival time.

In view of the foregoing, in the navigation device according to the present embodiment, only in the case where the vehicle's location is lost, the user is allowed to set the vehicle's location in a similar manner as setting a destination (S216). More specifically, the user is allowed to conduct address search, or select the address from the information on the nearby facility, to determine the vehicle's location, thereby enabling destination setting, route calculation, and the like.

Thereafter, while the vehicle is running on the road, although the device cannot guide the user until GPS signals are received, once the GPS signals are input, the device can set the location as the vehicle's location, so that the device can guide the user by autonomous navigation.

Storage of the navigation information and sharing of the information between the base units will now be described.

In a navigation device, for determining the location of a vehicle, parameters unique to the vehicle are used. Specifically, as the sensitivity of the gyro sensor 24 will vary depending on the state of attachment, the attachment angle is measured and stored, so that the stored value is used during navigation for correcting the sensor output.

In the autonomous navigation, in order to calculate the travel distance, a distance traveled per pulse (Distance Per Pulse) output from the wheel speed sensor 22 is used. The DPP is calculated on the basis of the movement trajectory derived from the GPS signals and the number of pulses of the wheel speed sensor 22, and is updated constantly.

The attachment angle of the gyro sensor 24 and the travel distance DPP are parameters unique to the vehicle to which the navigation device is mounted. Thus, in the present embodiment, these parameters are stored in the EEPROM 10*r* in the base unit 10. When the user replaces the base unit 10 alone with a new one, the information may be temporarily saved in a memory card or the like, and entered into the new base unit 10.

Taking this into consideration, in the navigation device according to the present embodiment, the information (i.e. parameters) stored in the EEPROM 10*r* in the base unit 10 is temporarily saved in the front panel unit 14, and the information is reentered (or, copied) to a new base unit 10 in accordance with the instruction of the navigation microcomputer 14*m*. This allows the information to be shared even when the base unit is replaced.

Interference between wireless modules will now be described.

The navigation device according to the present embodiment includes two wireless modules, the BT module 14*q* and the wireless module 14*x*, in the front panel unit 14. Thus, interference may occur therebetween. For example, playback of a DVD may be requested or a mobile phone equipped with a hands-free microphone may receive a call while the vehicle is backing up (with the rear camera video images being displayed), in which case the interference takes place between the device operations.

Therefore, an order of priority is set, and the devices are operated in accordance therewith. FIG. 15 illustrates the processing. In the figure, the horizontal axis represents events, i.e. the operations of the reverse gear switch 26, the hands-free mobile phone, and the DVD, while the vertical axis represents the states corresponding thereto, i.e. the states where the vehicle is backing up, a call is incoming, a line is in use and the DVD is playing.

Figure 16:
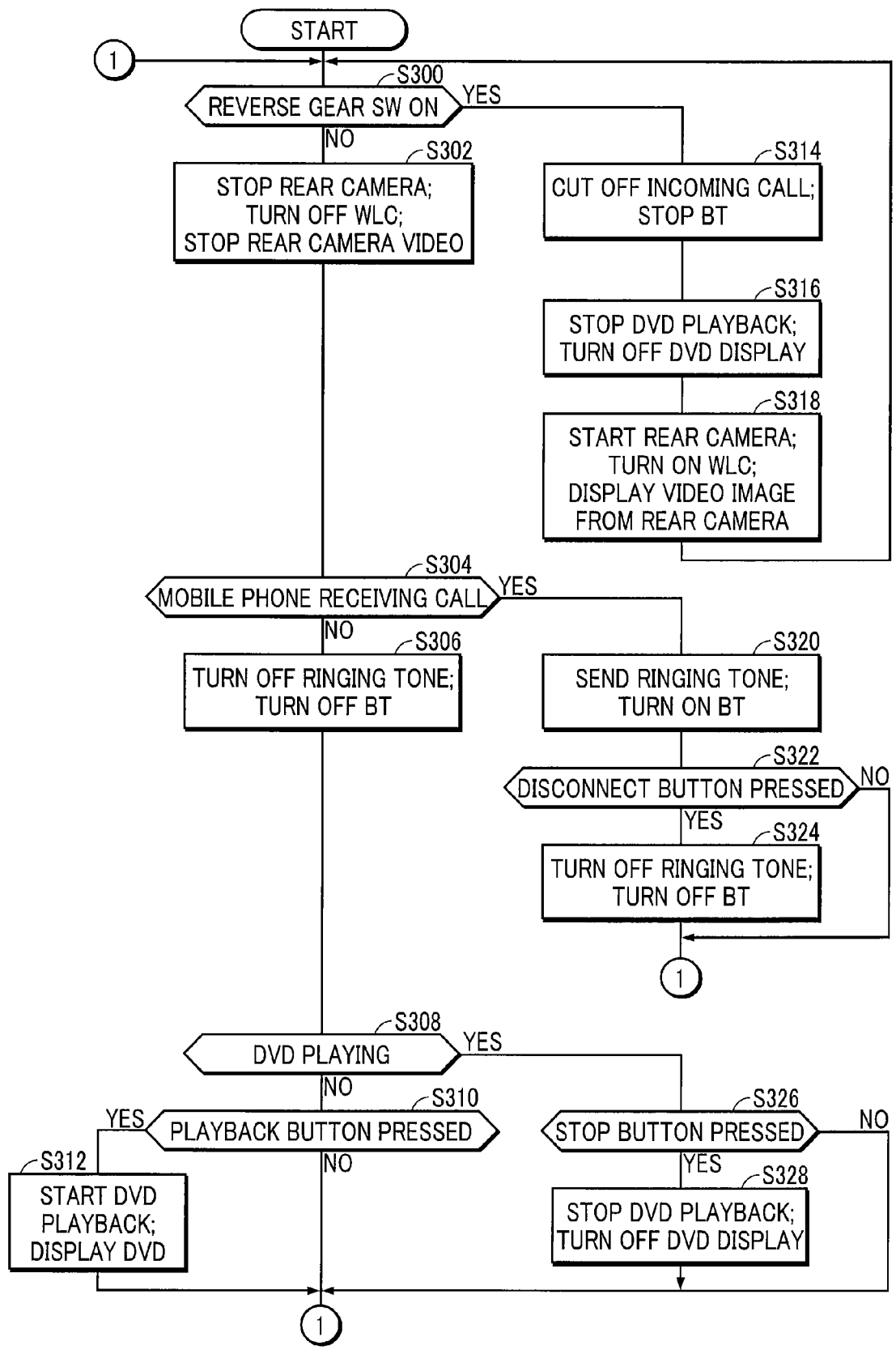
FIG. 16 is a flowchart illustrating the processing executed on the basis of FIG. 15.

FIG. 16 is a flowchart illustrating the processing executed on the basis of the contents shown in FIG. 15.

Firstly, in S300, it is determined whether the reverse gear switch 26 is outputting an ON signal, or, whether the vehicle is about to back up. If NO, the process proceeds to S302, where the operation of the rear camera (i.e. wireless camera WLC in this case) is stopped, the WLC radio function is turned off, and the video images from the rear camera are terminated.

The process then proceeds to S304, where it is determined whether the mobile phone is receiving (or originating) a call. If NO, the process proceeds to S306, where the ringing function of the hands-free mechanism is turned off, and the function of the BT module 14*q* is also turned off (i.e., it is set to a standby mode).

The process then proceeds to S308, where it is determined whether the DVD is playing. If NO, the process proceeds to S310, where it is determined whether the play button (on the touch panel 14*s*) has been pressed. If YES, the process proceeds to S312, where playback of the DVD is started and the DVD video image is displayed on the liquid crystal panel 14*b*, because it is unnecessary to display the video images from the rear camera as the vehicle is not about to back up.

On the other hand, if YES in S300, the process proceeds to S314, where the incoming call (or the outgoing call) on the mobile phone is cut off, and the function of the BT module 14*q* is shut off because it is unnecessary. The process then proceeds to S316, where playback of the DVD is stopped, and display of the DVD is also turned off. Then in S318, the rear camera is activated, the WLC function is turned on, and the video images from the rear camera are displayed. The process then returns to S300.

If YES in S304, the process proceeds to S320, where the ring tone is output through the vehicle-mounted speaker, and the BT module 14*q* is turned on (i.e. activated) so as to transmit and receive voice. Next, in S322, it is determined whether the disconnect button (on the touch panel 14*s*) has been pressed. If YES, the process proceeds to S324, where the ring tone is turned off, and the BT module 14*q* is turned off because it is unnecessary. If NO in S322, S324 is skipped.

If YES in S308, the process proceeds to S326, where it is determined whether the stop button on the touch panel 14*s* has been pressed. If YES, the process proceeds to S328, where playback of the DVD is stopped, and display of the DVD is turned off. If NO in S326, S328 is skipped.

The processing shown in FIGS. 15 and 16 ensures that the video images from the rear camera that picks up the images of the backward of the vehicle A are displayed to the user, so that the user is able to back up while referring to the images. This also eliminates the interference between the operations of the devices.

The FM transmitter 12*e* in the cradle unit 12 will now be described.

In the cradle unit 12 shown in FIG. 6B, the FM transmitter 12*e* is a means for transmitting music content and/or voice guidance stored in the memory card 12*r* from the vehicle-mounted speaker of the vehicle B. For such a radio wave transmitter, however, the output level is regulated under the radio law of the interested country or state, forcing the transmitter to output only weak radio waves. As a result, when the vehicle is running near a radio station, noise will occur due to its radio waves.

Therefore, in the navigation device according to the present embodiment, a database of the frequencies of the local radio stations is stored in the EEPROM 12*f* in the cradle unit 12, and the cradle microcomputer 12*b* searches for an unused frequency in accordance with the region where the vehicle is traveling, and displays the searched frequency on the liquid crystal panel 14*b* of the front panel unit 14.

The user can then tune the car receiver (the car audio) to that frequency, to listen to the music content and/or the voice guidance output from the vehicle-mounted speaker. This enables the music content and/or the voice guidance to be provided to the user in a low-noise condition. The cradle microcomputer 12*b* causes the music content and/or the voice guidance to be output from the vehicle-mounted speaker via the FM transmitter 12*e*.

While the FM transmitter is arranged in the cradle unit 12 in the present embodiment, it may be provided in the base unit 10 instead.

Now, the GUI shown in FIG. 8 will be described in more detail.

As explained above, in the case of operating a device like the navigation device that is provided with a large number of functions and thus requiring various settings, the GUI may be used to allow a user to visually understand how to operate the device. Thus, in the navigation device according to the present embodiment, a configuration enabling customization of the GUI is incorporated into the navigation microcomputer 14*m* in the front panel unit 14 shown in FIG. 6A, to allow a user to execute the functions by operating the touch panel 14*s*.

Figure 17:
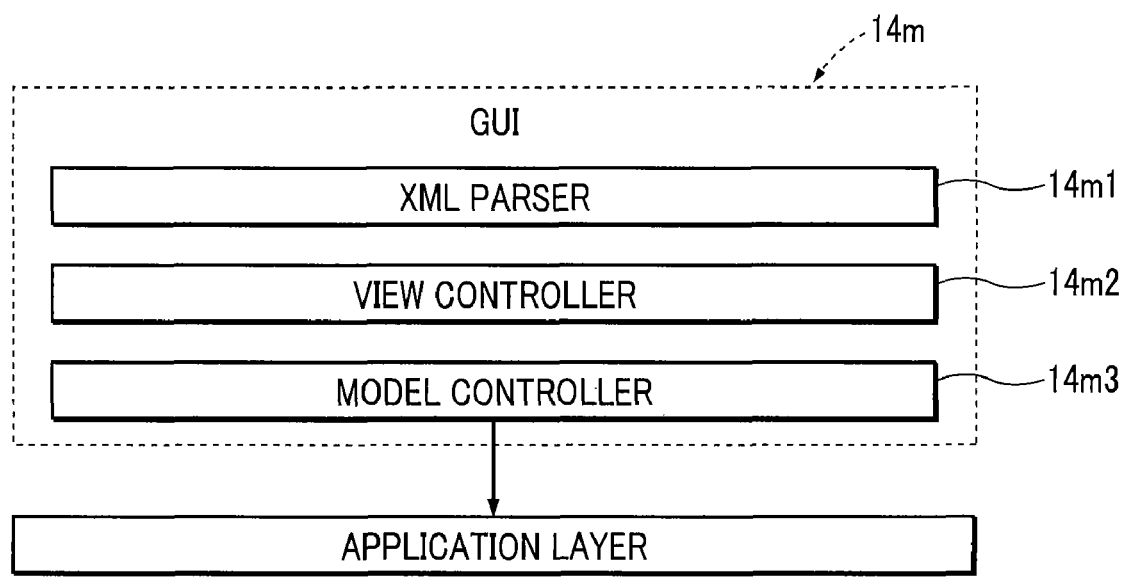
FIG. 17 is a block diagram showing the configuration of a GUI (function) shown in FIG. 8.

FIG. 17 shows the configuration of the GUI (function) shown in FIG. 8. To explain the GUI in detail, the XML parser 14*m*1 defines the screen configuration, including the button positions, button file names, and button names, and detects button touches. The VIEW controller 14*m*2 defines the menu structure. Specifically, it determines which skin is to be displayed when a button is pressed. The MODEL controller 14*m*3 outputs the selected function message to the application layer. The application layer executes the commands transmitted from the GUI.

With the configuration as shown in FIG. 17, although the user may be able to visually understand how to operate the device, the number of menus may increase with increasing number of functions, resulting in the menus of a greater number of hierarchical levels. In such a case, in order to execute an intended function, the user needs to select the menu buttons a large number of times so as to select the intended function, leading to rather troublesome operations. From the standpoint of a user, the device with limited functions may be easier to use.

A menu screen is composed of skin files, prepared for the individual screens, which each define the screen configuration (including the background file names, button display positions, button file names, and button names) and also define messages to be sent when the corresponding buttons are selected, and bitmap files, prepared for the individual constituting elements (i.e. the menu buttons) of the menu screen, which are called from the skin files. The skin files and the bitmap files are stored in the non-volatile memory (FLASH memory) 14*o*, and the navigation microcomputer 14*m* uses the XML parser function to display the files on the liquid crystal panel 14*b*.

The GUI controller transmits a message to the VIEW controller in response to a user operation. The VIEW controller refers to the content of the message to switch the skin file to be displayed, and issues a command request to the MODEL controller as required. The MODEL controller confirms the requested command type, and transmits an operation command to the application layer. With this structure, when the skin file is replaced, the menu screen is changed. The skin files are described in the xml language or the like.

Figure 18:
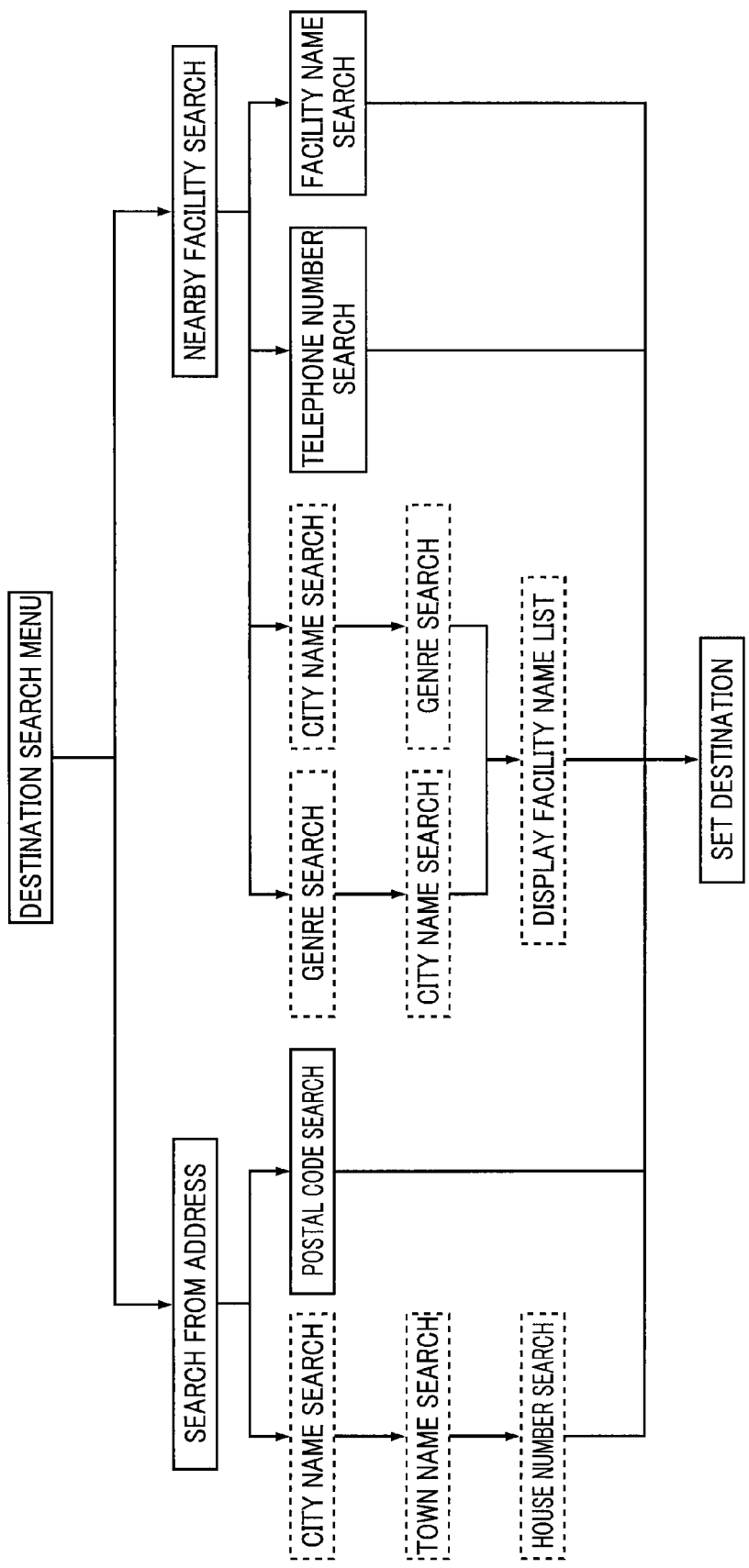
FIG. 18 illustrates a process of deleting functions in the configuration shown in FIG. 17.

For customizing the GUI, skins and controllers are created under the menu configuration with all functions available. Then, skin files are created by excluding from the menu screen any keys the user wishes to delete, and the resultant skin files are used to replace the corresponding skin files. As a result, the menus associated with the deleted buttons and their subordinates are no longer displayed, and the application commands associated therewith are no longer issued, whereby the functions can be reduced. FIG. 18 shows an example thereof (with the deleted portions delimited by broken lines).

Further, in the case where the skin files are described in the XML language or the like, the layout and/or shapes of the buttons may be changed only by changing the description of the skin files. Using this technique, customization can be realized only by replacing the skin files, without the need to rewrite the software itself.

The original skin files are stored in the non-volatile memory, and the skin files the user wishes to use for replacement are stored in the memory card 14*r* or the like. The user may store the desired skin files in the memory card 14*r* and, after power is on, the user may replace the skins by selecting the files stored in the memory card 14*r* using a default skin select menu. In this case, however, the user needs to select the desired skins every time the power is on. That is, the settings are required every time the vehicle engine is stopped. If the skins are fixed, however, only a particular user can benefit from the skin change.

In the navigation device according to the present embodiment, the front panel unit 14, the base unit 10, and the cradle unit 12 each include a non-volatile memory and a microcomputer, and the memories store unique ID numbers which are used, upon attachment, for authentication of each other. That is, each microcomputer can identify the mated unit upon attachment. As the base unit 10 and the cradle unit 12 are each fastened to a vehicle, the front panel unit 14 can also identify the vehicle to which the front panel unit 14 is attached, on the basis of that ID number.

Recently, each person tends to possess a vehicle, and it is often the case that each vehicle has a particular user. Therefore, skin file names may be defined in advance in the front panel unit 14 in correspondence with the ID numbers of the units to which the front panel unit 14 is expected to be attached. In this case, when the ID number of the unit to which the front panel unit 14 has been attached is read, the skin file in the memory card 14*r* is automatically switched. This allows the user to automatically switch the skin file, upon attachment, in accordance with the vehicle.

It is of course conceivable that a user is not determined for each vehicle. Therefore, it is configured such that a menu is always provided with a button for switching to the original menu.

Figure 19:
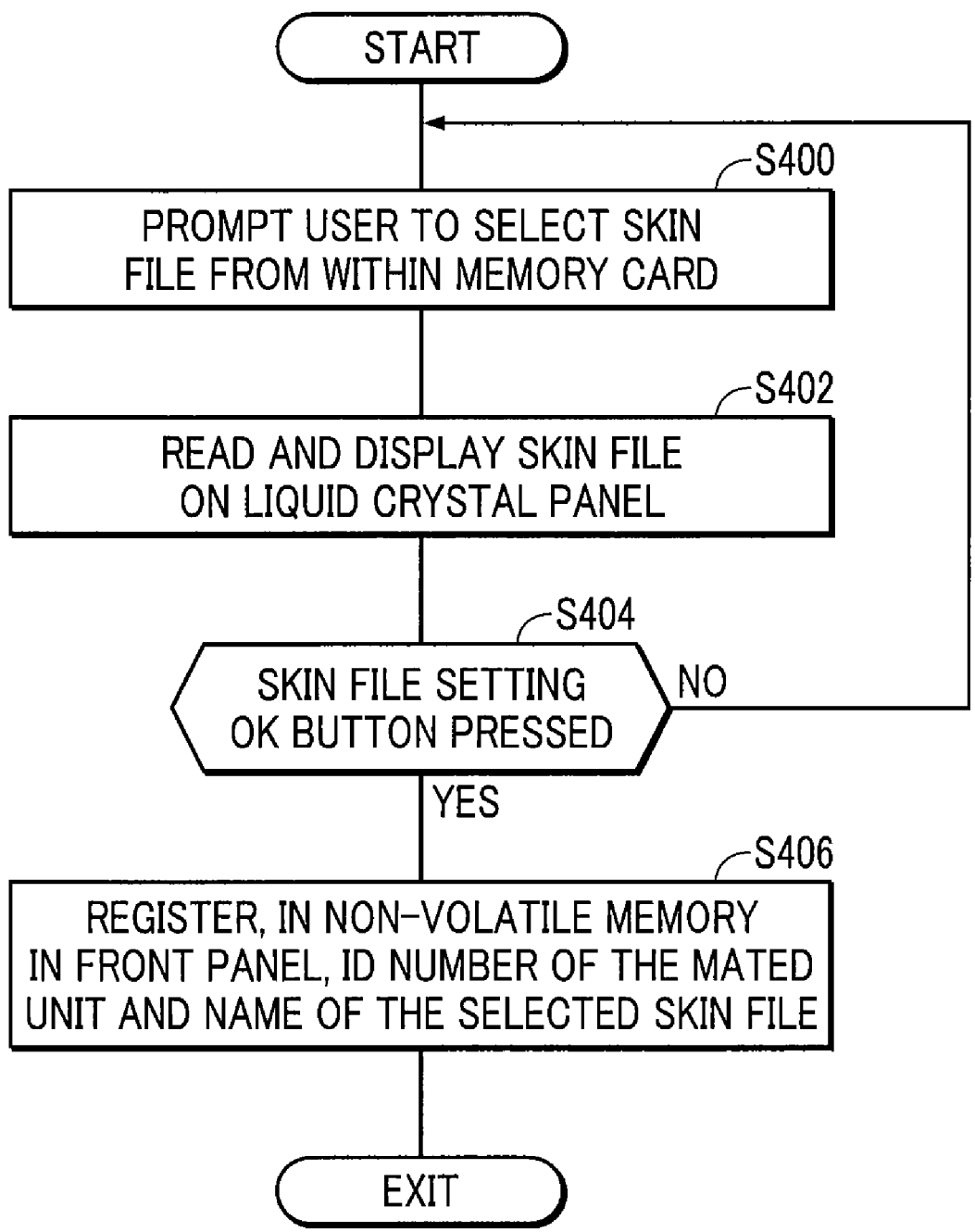
FIG. 19 is a flowchart illustrating a process of setting skin files in the case where a plurality of users of vehicles commonly use a single front panel unit.
Figure 20:
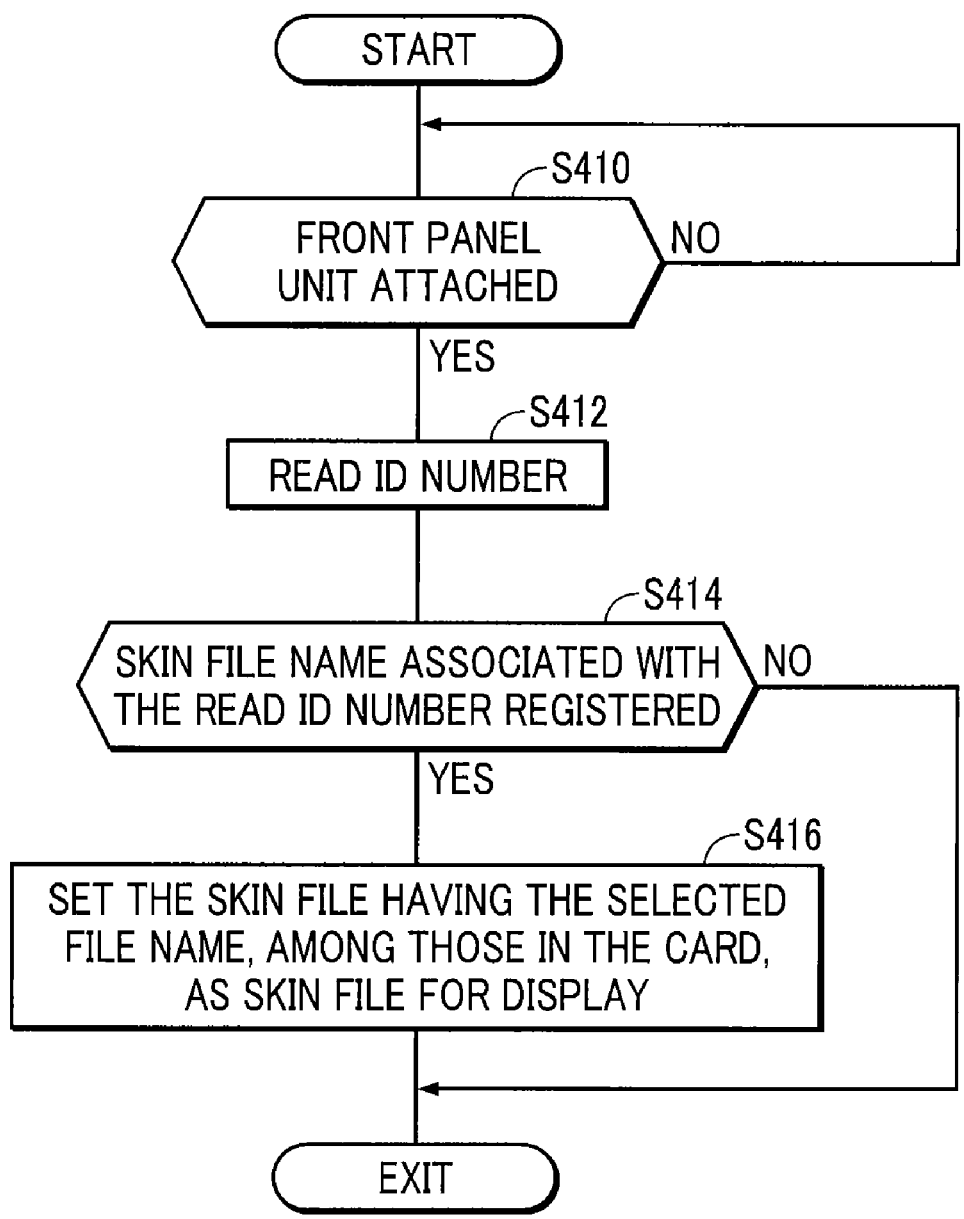
FIG. 20 is a flowchart illustrating an automatic skin-file selecting process, which is executed following the process in FIG. 19.

FIGS. 19 and 20 are flowcharts for such processing. The processing is executed by the navigation microcomputer 14*m*.

The processing shown in FIG. 19 is based on the premise that a plurality of types of skin files are stored in the memory card 14*r* of the navigation microcomputer 14*m* in the front panel unit 14, and is executed in response to a user operation in each of a plurality of vehicles in the state where the front panel unit 14 is attached to the base unit 10 or the cradle unit 12.

Firstly, in S400, the user is prompted to select one of the plurality of types of skin files stored in the memory card 14*r* described above. The process then proceeds to S402, where the selected skin file is read to be displayed on the liquid crystal panel 14*b*. Then, in S404, it is determined whether the user has pressed a skin file setting OK button, to see whether the user has agreed to the setting. If NO, the process returns to S400.

On the other hand, if YES in S404, the process proceeds to S406, where the ID number of the mated unit, i.e. the base unit 10 or the cradle unit 12 in the vehicle possessed by the user who initiated the operation, is input, and the input ID number and the name of the selected skin file are registered (or, stored) in the non-volatile memory (FLASH memory) 14*o* in the front panel unit 14.

In this case, the information may be registered (or, stored) in the EEPROM 10*r* or the EEPROM 12*f* included in the base unit 10 or the cradle unit 12, or a separate non-volatile memory may be provided for registering (or, storing) the information therein.

Still alternatively, in addition to providing the separate non-volatile memory in the front panel unit 14, a new non-volatile memory may also be provided in the base unit 10 or the cradle unit 12, and the ID number of the mated unit, the selected skin file, and the name thereof may be registered (or, stored) in both non-volatile memories. In this case, if one of the data is not correct or cannot be used, the other data with no error may be used. Further, in the case where both data have no error but differ from each other, the data in the non-volatile memory in the front panel unit 14 may be used in preference. This can enhance the reliability of the device.

The processing shown in FIG. 20 is executed, after the processing in FIG. 19 is completed, when the detached front panel unit 14 is attached to the base unit 10 or the cradle unit 12.

Firstly, in S410, it is confirmed that the front panel unit 14 has been attached to the base unit 10 or the cradle unit 12. The process then proceeds to S412, where the ID number of the unit (the base unit 10 or the cradle unit 12) to which the front panel unit has been attached is read. The process then proceeds to S414, where it is determined whether there is registered a skin file having the name associated with the read ID number. If NO in S414, the succeeding process step is skipped. On the other hand, if YES in S414, the process proceeds to S416, where the skin file with the selected name among those stored in the memory card 14r is set as the skin file for display. More specifically, the same is automatically selected.

In this manner, the user is able to automatically switch the skin file, upon attachment, in accordance with the vehicle. It is of course conceivable that a user is not determined for each vehicle. Accordingly, it is configured such that a button for switching to the original menu is always prepared in the menu.

While the procedure of changing the GUI described above assumes that a user selects one GUI from among a plurality of GUIs prepared in advance, it is also conceivable that a user customizes the GUI by him/herself. In such a case, while the user is supposed to select unused buttons during the process of organizing the menu, there may be a chance that the user unintentionally erases a necessary button.

In view of the foregoing, in the present embodiment, an "inerasable" attribute is assigned to each of such buttons during the button erasing procedure, and it is configured such that the attribute is unfailingly confirmed during the process of selecting a button to be erased, to ensure that any button that should not be erased is prevented from being erased. As for the button for which it is known from the beginning that the button should not be erased, a hard key is assigned thereto, and the button is prevented from being displayed on a menu editing screen.

Figure 22:
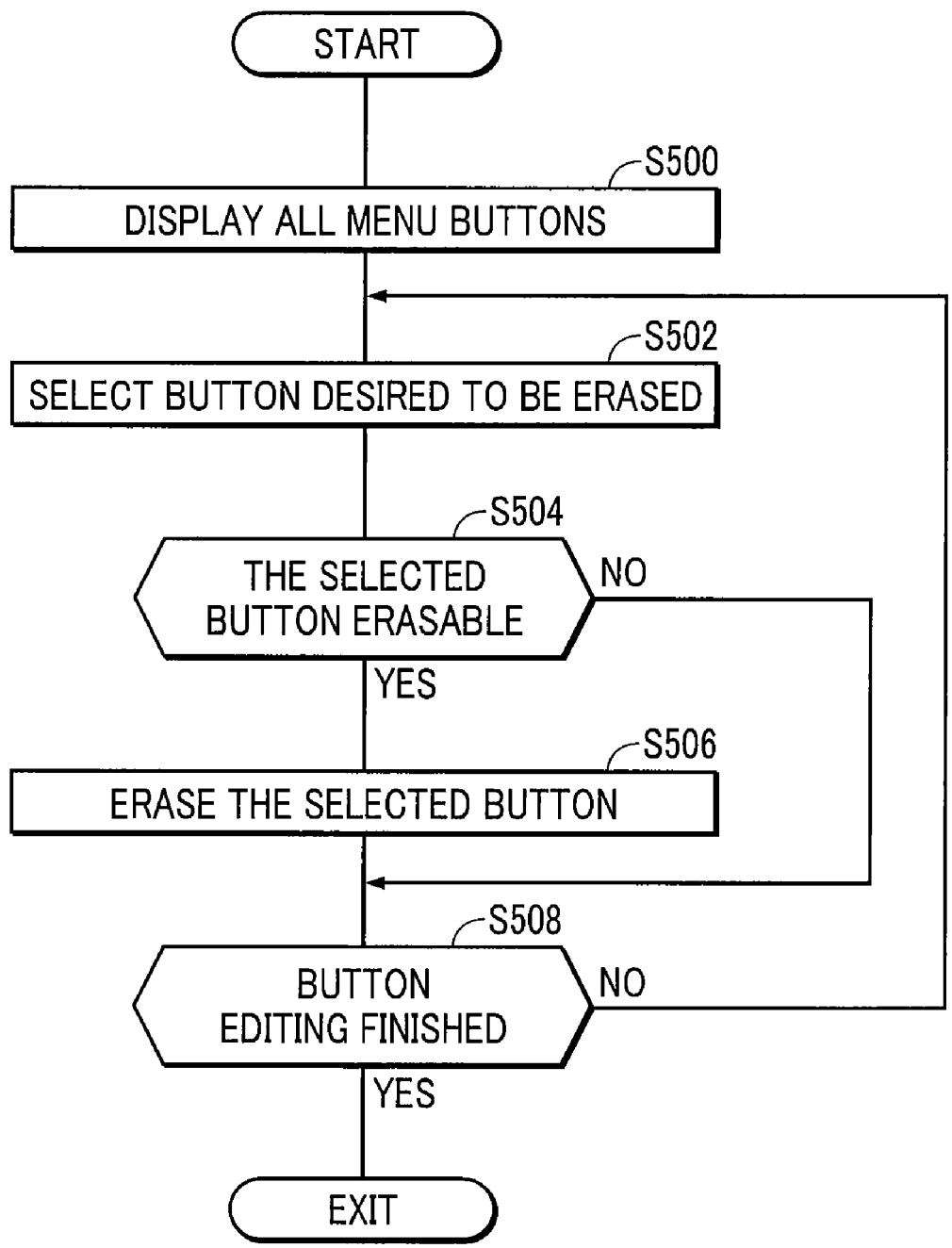
FIG. 22 is a flowchart illustrating a process executed in accordance with FIG. 21.

FIG. 21 shows examples of the (inerasable) buttons that should not be erased. FIG. 22 is a flowchart illustrating the processing for the inerasable buttons.

Firstly, in S500, all the menu buttons are displayed. The process then proceeds to S502, where the user is prompted to select a button the user wishes to erase. The process then proceeds to S504, where it is determined whether the selected button is erasable. If so, the process proceeds to S506, where the selected button is erased. If NO in S504, the processing in S506 is skipped.

The process then proceeds to S508, where it is determined whether the button editing has been finished. If not, the process returns to S502. If so, the program is exited.

In the navigation device of the present embodiment, if the one-seg TV tuner 10g is installed in the front panel unit 14, the video signals received by a vehicle exterior antenna would be transmitted to the front panel unit 14 via the base unit 10. In such a case, the broadcast waves that could be obtained from the antenna are of high frequency and weak, which are susceptible to the impedance of the path and the surrounding noise, so that it would not be possible to obtain video signals of good quality. In particular, the front panel unit 14 and the base unit 10 are connected via the connector 10z, so that the contact loss would also take place, adversely affecting the video signals.

With the configuration described above, the GUI is used to allow the user to visually understand the way of operating the device. This facilitates the operations for the user. Furthermore, the menu buttons may be narrowed down as required, which further facilitates the operations for the user. In the case where the user customizes the GUI by him/herself, the necessary buttons are prevented from being erased inadvertently.

The installation site of the one-seg tuner 10p will now be described.

In the case where the navigation device is provided with the TV viewing function, the use of the function while driving needs to be regulated for the safety. In the case where the TV viewing function is centralized in the front panel unit 14, the output from the wheel speed sensor 22 for use in determining whether the vehicle is actually running or not would be transmitted from the base unit 10 to the navigation microcomputer 14m, which in turn would use the information to switch on/off the TV viewing function.

With this configuration, however, in the event that the signal line (i.e. serial data line) connecting the base unit 10 with the front panel unit 14 is hacked and a pseudo signal is transmitted to the front panel unit 14, the TV viewing function that has been off might be turned on.

In the navigation device of the present embodiment, if the one-seg TV tuner 10p is installed in the front panel unit 14, the video signals received by a vehicle exterior antenna would be transmitted to the front panel unit 14 via the base unit 10. In such a case, the broadcast waves that could be obtained from the antenna are of high frequency and weak, which are susceptible to the impedance of the path and the surrounding noise, so that it would not be possible to obtain video signals of good quality. In particular, the front panel unit 14 and the base unit 10 are connected via the connector 10e, so that the contact loss would also take place, adversely affecting the video signals.

Further, if the TV antenna should be provided directly on the front panel unit 14 in the state where the same is attached to the base unit 10, the antenna would have to be mounted on an exposed part, in which case the liquid crystal panel (or, display) 14b would have to be reduced in size.

In view of the foregoing points, in the navigation device according to the present embodiment, as shown in FIG. 6A, the one-seg TV tuner 10g is installed in the base unit 10. The system microcomputer 10i in the base unit 10 receives the output from the wheel speed sensor 22, so that it is readily possible to determine whether the vehicle is running, and if so, the system microcomputer 10i is able to regulate the operations of the one-seg TV tuner 10g.

In other words, the determination as to whether the vehicle is running and the regulation on the operations of the one-seg TV tuner 10g are both completed inside the base unit 10. This makes it difficult to lift the regulation on the TV viewing by hacking from the outside.

Furthermore, when the video signals are converted into digital signals in the one-seg TV tuner 10g before being transmitted to the front panel unit 14, the effects of the impedance on the path and the noise can be lessened, so that the quality of the video images can be improved.

Antitheft measures for the front panel unit 14 will now be described.

The front panel unit 14, which is attachable to and detachable from the base unit 10, is at risk of being stolen. Thus, in the present embodiment, the ID numbers of the base unit 10 and the cradle unit 12 are each registered in the EEPROM 10r of the base unit 10 or the EEPROM 12*f* of the cradle unit 12, and matching against them is performed so as to deter theft.

Figure 23:
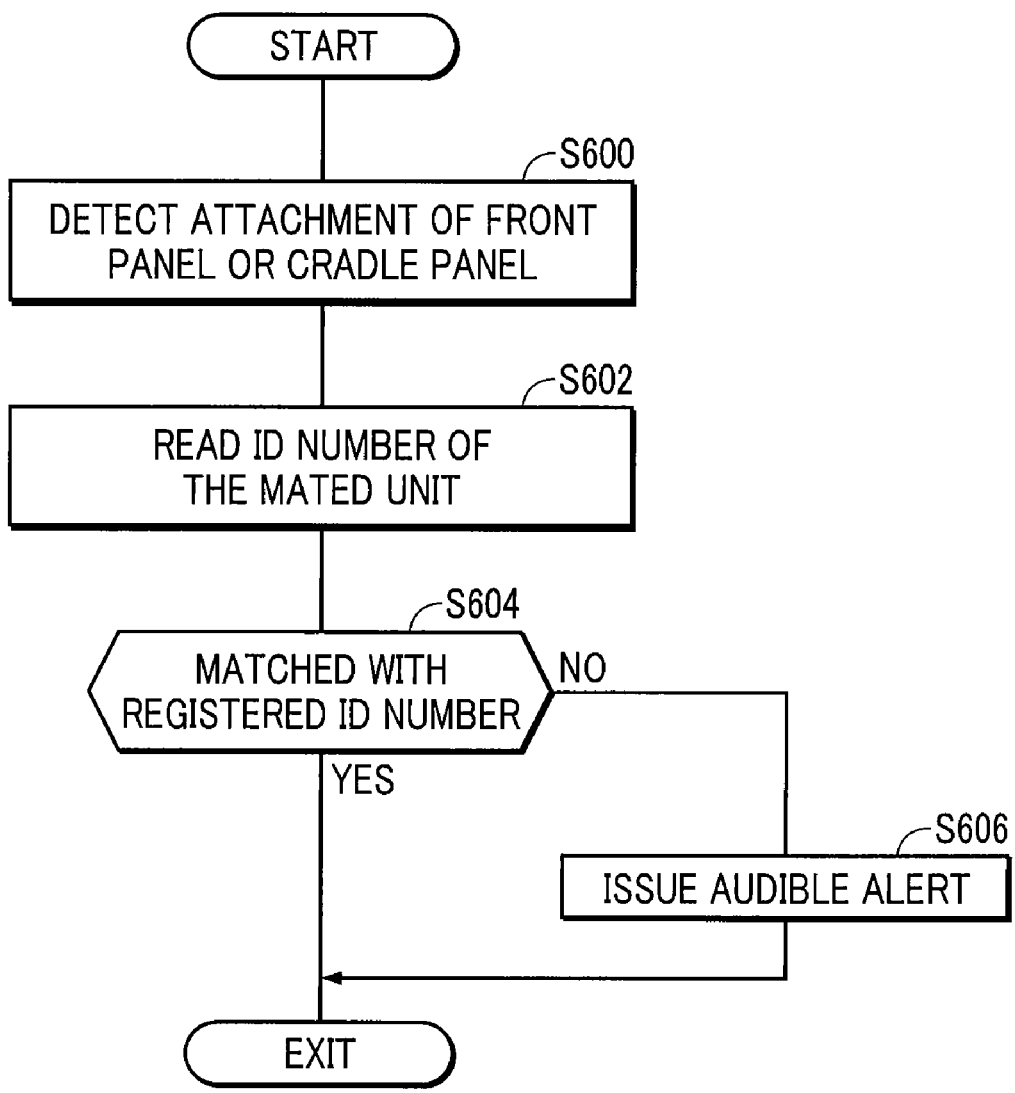
FIG. 23 is a flowchart illustrating a process of determining theft of a front panel unit, which is executed by the navigation microcomputer in the front panel unit.

FIG. 23 is a flowchart illustrating the antitheft processing executed by the navigation microcomputer 14*m*.

Firstly, in S600, it is determined whether attachment of the front panel unit 14 in which the navigation microcomputer itself is contained has been detected. This is similar to the processing in S10 in FIG. 10 described above. If the front panel unit 14 is attached, the navigation microcomputer 14*m* comes to be communicable with the system microcomputer 10*i* or the cradle microcomputer 12*b* over a signal line, so that the navigation microcomputer 14*m* is able to detect the attachment of the own unit.

Next, in S602, the ID number (i.e. identification number) of the mated unit (the base unit or the cradle unit) is read. The process then proceeds to S604, where it is determined whether the unit to which the front panel unit 14 has been attached is the proper unit (i.e. the base unit 10 or the cradle unit 12). If YES, the process is terminated. On the other hand, if NO, the process proceeds to S606, where an audible alert is issued. At the same time, or in place of issuing the audible alert, the current location information may be automatically notified to a preset telephone number via the BT module 14*q*.

With the processing described above, in the event that the front panel unit 14 is stolen and attached to another base unit or a cradle unit 12, the front panel unit 14 produces a warning sound and/or that event is notified to the owner of the front panel unit 14 or another person registered in advance. This makes it possible to give a warning to the person who has stolen the front panel unit 14 or take a measure to cause him/her to return the front panel unit 14.

The processing shown in FIG. 23 is executed by the microcomputer (i.e. navigation microcomputer) 14*m*. The navigation microcomputer 14*m* executes various other processing including the processing shown in FIG. 10. The system microcomputer 10*i* in the base unit 10 also executes various processing including the processing shown in FIG. 13. The same applies to the cradle microcomputer 12*b* in the cradle unit 12.

Hereinafter, the processing executed by the microcomputers will be described with reference to FIGS. 24 to 26.

Figure 24:
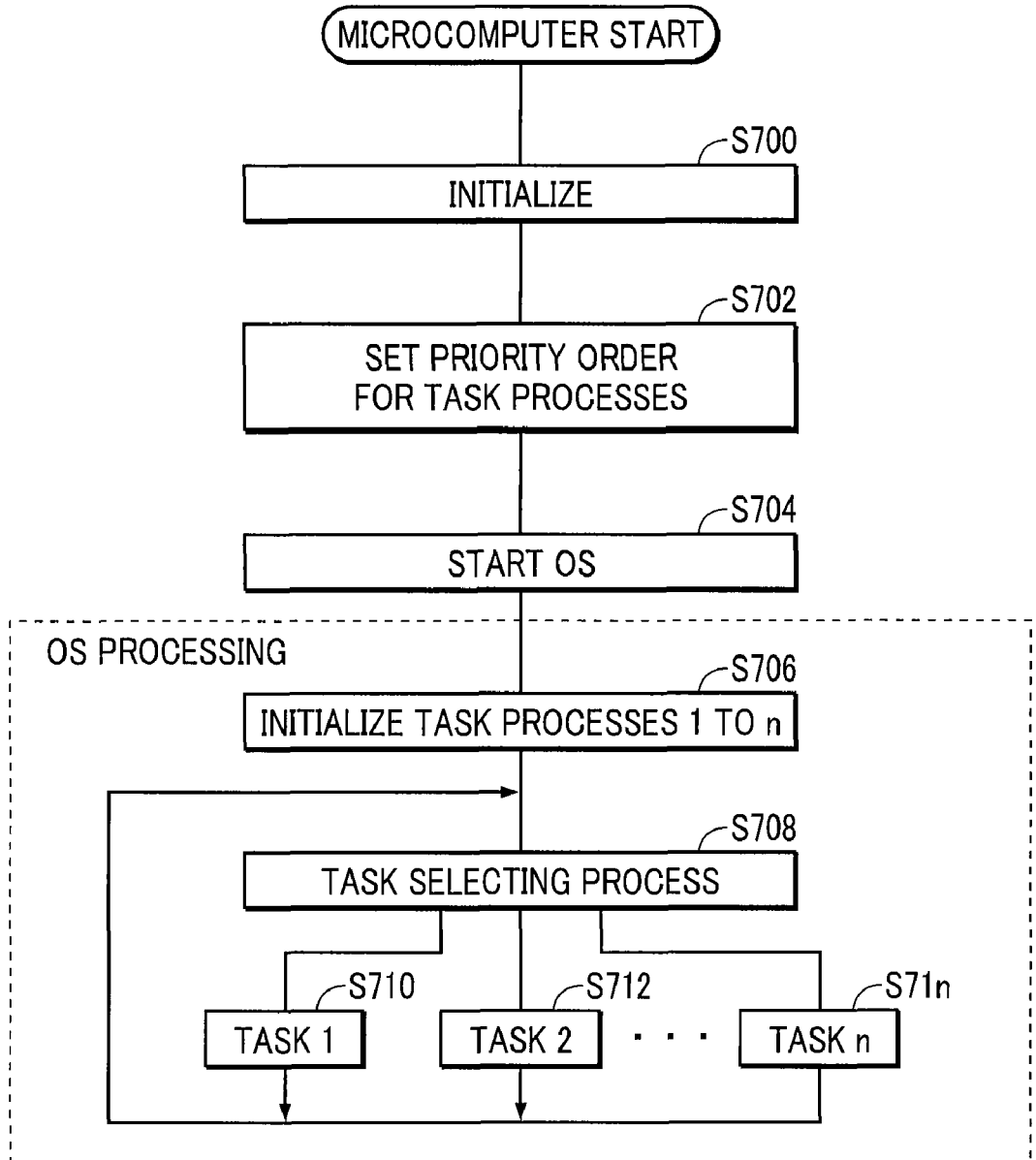
FIG. 24 is a flowchart illustrating a main routine for a microcomputer to perform a process, such as the process shown in FIG. 10 performed by the navigation microcomputer in the front panel unit.

FIG. 24 is a flowchart illustrating a main routine for performing the above-described processing by the navigation microcomputer 14*m*, the system microcomputer 10*i*, and the cradle microcomputer 12*b*, such as the processing (hereinafter, referred to as "task process") shown in FIG. 10 performed by the navigation microcomputer 14*m*.

This routine is started when the ignition key is turned on and, thus, operating power is supplied from the power supply (i.e. battery) of the vehicle A (or B).

Firstly, an initialization process is executed (S700). Then, the priority order of the task processes, from 1 to n, is set in a prescribed RAM area (S702).

Next, the OS (operating system) is started (S704), and all the task processes are initialized (S706). The process then enters a standby mode in a task selecting process (S708). In the standby mode, when an event flag is set by interrupt processing, as will be described later, the event (one of S710 to S71*n*) corresponding to the event flag that has been set is executed. When the process of the corresponding event is finished, the process returns to the task selecting process (S708), where the standby mode is maintained until an event flag is set by the next interrupt processing.

In the task selecting process (S708), specifically, it is monitored whether an event flag has been set through the interrupt processing, which will be described below, and when the setting of the flag is detected, the task process corresponding to the event flag thus set is executed. In the case where there are two or more interrupts, the task processes are executed in accordance with the priority order set in S702. The processing from the initialization (S706) to the event (one of S710 to S71*n*) corresponds to the OS processing.

Figure 25:
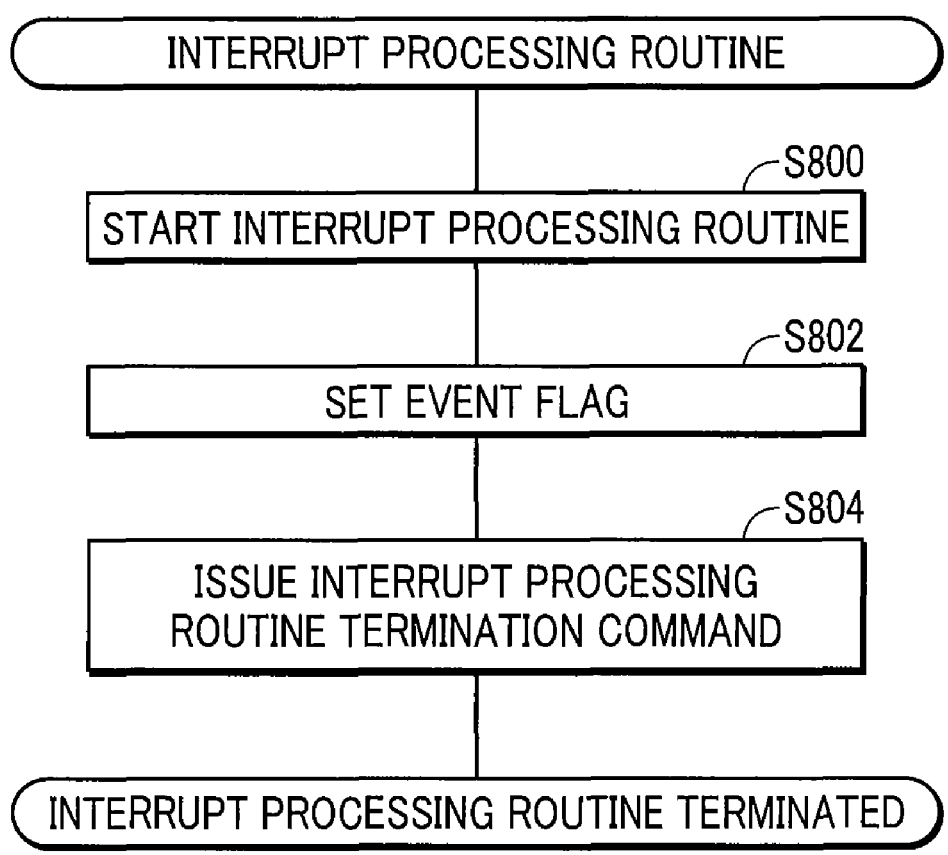
FIG. 25 is a flowchart illustrating the routine of interrupt processing, described in conjunction with the processing in FIG. 24.
Figure 26:
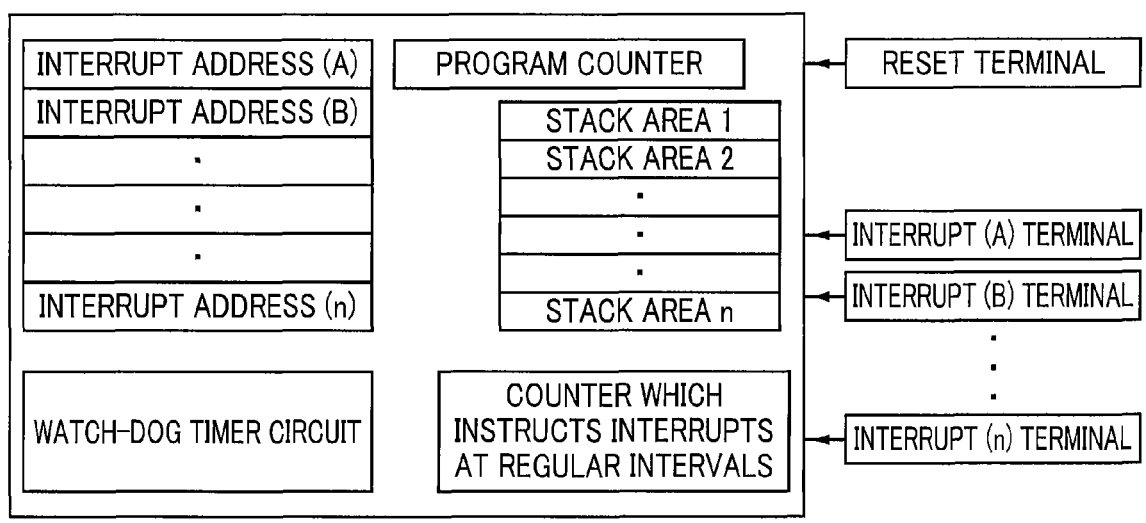
FIG. 26 is a block diagram showing the hardware configuration of the microcomputer used for the interrupt processing shown in FIG. 25.

FIG. 25 is a flowchart illustrating the interrupt processing routine. FIG. 26 is a block diagram showing the hardware configuration of the microcomputer used for the interrupt processing.

The interrupt processing is broadly divided into two parts: a hardware processing part which executes processing independently from software that is set afterwards in the microcomputer; and an interrupt processing routine part which is software that is set for each microcomputer. In the event that data or a trigger signal is input to an interrupt terminal (A to n) in FIG. 26, or in the event that a counter that instructs interrupts at predetermined time intervals issues a trigger signal, the above-described hardware processing is started in the microcomputer, and the contents recorded in various registers are transferred to stack areas (1 to n). The registers contain therein the data that is currently used or the data that has been processed in the OS processing at that time.

Next, the current value in the program counter is transferred to the stack area, and then, the value written in the interrupt address (A to n) corresponding to the interrupt terminal into which the data or the like was input is written into the program counter. Once the value in the program counter is overwritten, the program currently processed is suspended (held), and the interrupt processing routine in FIG. 25 is started.

In the interrupt processing routine, firstly, the interrupt processing routine is started (S800), and then, the event flag corresponding e.g. to the terminal that received the interrupt is set (S802). Lastly, an interrupt processing routine termination command is issued (S804), whereby the process is terminated.

Once issuance of the interrupt processing routine termination command is executed, the hardware processing in the microcomputer is started again. The values that had been transferred to the respective stack areas (1 to n) at the time of suspension are written back to the original registers, and then, the value of the program counter that had been temporarily saved at the time of suspension is written back from the stack area to the program counter, whereby the series of interrupt processing is terminated, and the process returns to the state immediately before the interrupt. From this time point onward, the suspended (held) program that was being executed immediately before the interrupt is executed again.

Antennas will now be described.

Figure 27:
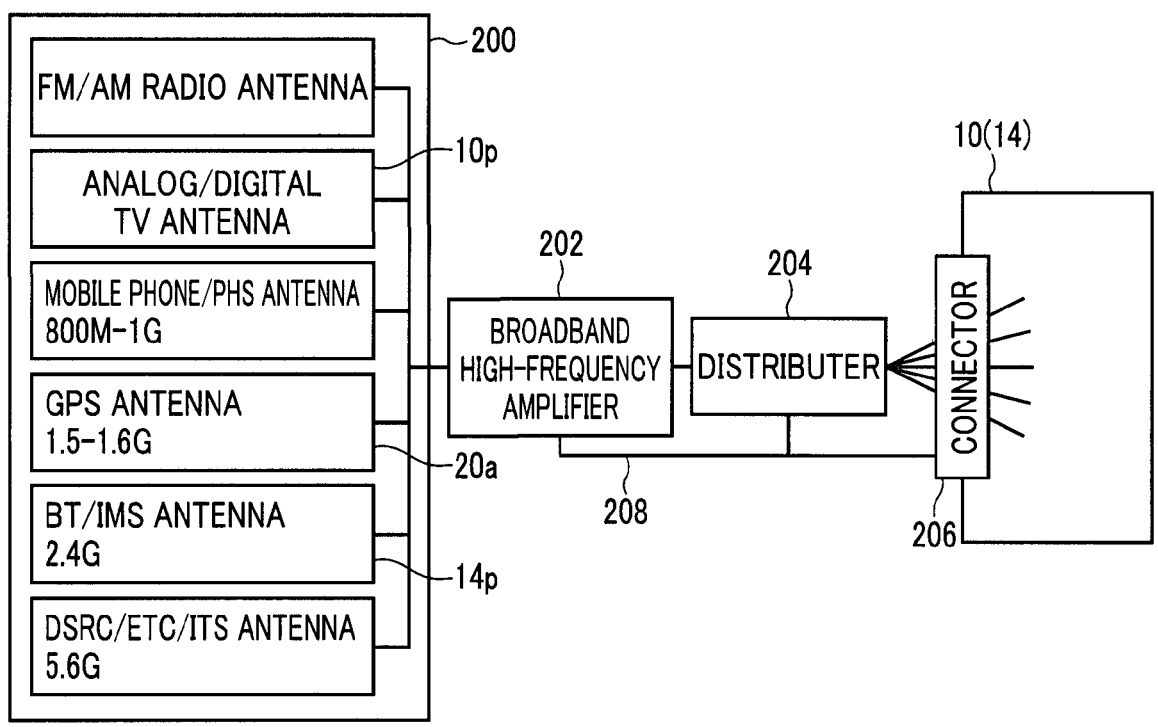

As apparent from FIGS. 6 and 7, the navigation device according to the present embodiment includes a large number of antennas. Besides the navigation device, the vehicle is also mounted with the antenna for the FM/AM radio. Although separate antennas may be arranged therefor, in this example, an integral-type film antenna 200 is used, as shown in FIG. 27.

The output of this film antenna 200 is amplified by a broadband high-frequency amplifier 202, and distributed by a distributer 204 so as to be input via a connector 206 to the base unit 10 (or the front panel unit 14 or the cradle unit 12). The reference numeral 208 denotes a power supply line. The film antenna 200 may be stuck on the windshield 18, rear window, roof outer wall surface, rearview mirror, or other part of the vehicle.

Figure 28:
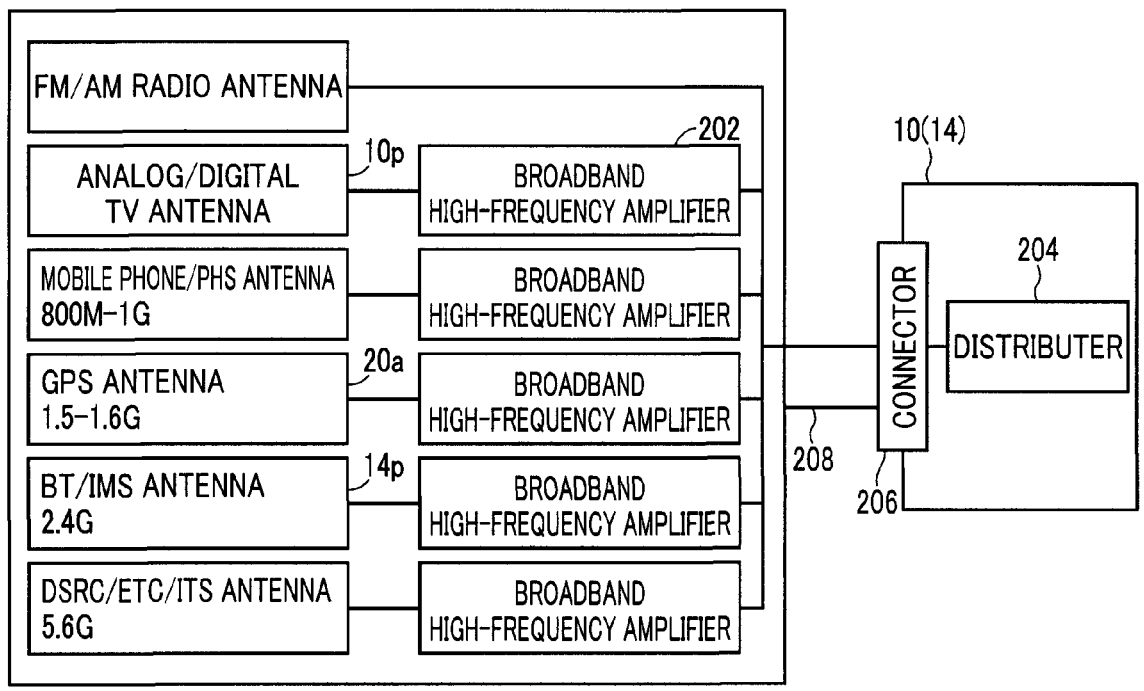

Alternatively, the film antenna 200 may contain high-frequency amplifiers 202 for the respective antennas, as shown in FIG. 28, and their outputs may be input into the base unit 10 via the connector 206 and the distributor 204. In this case, it is unnecessary to connect a high-frequency amplifier 202 to the FM/AM radio antenna, because it has a relatively long wavelength.

Figure 29:
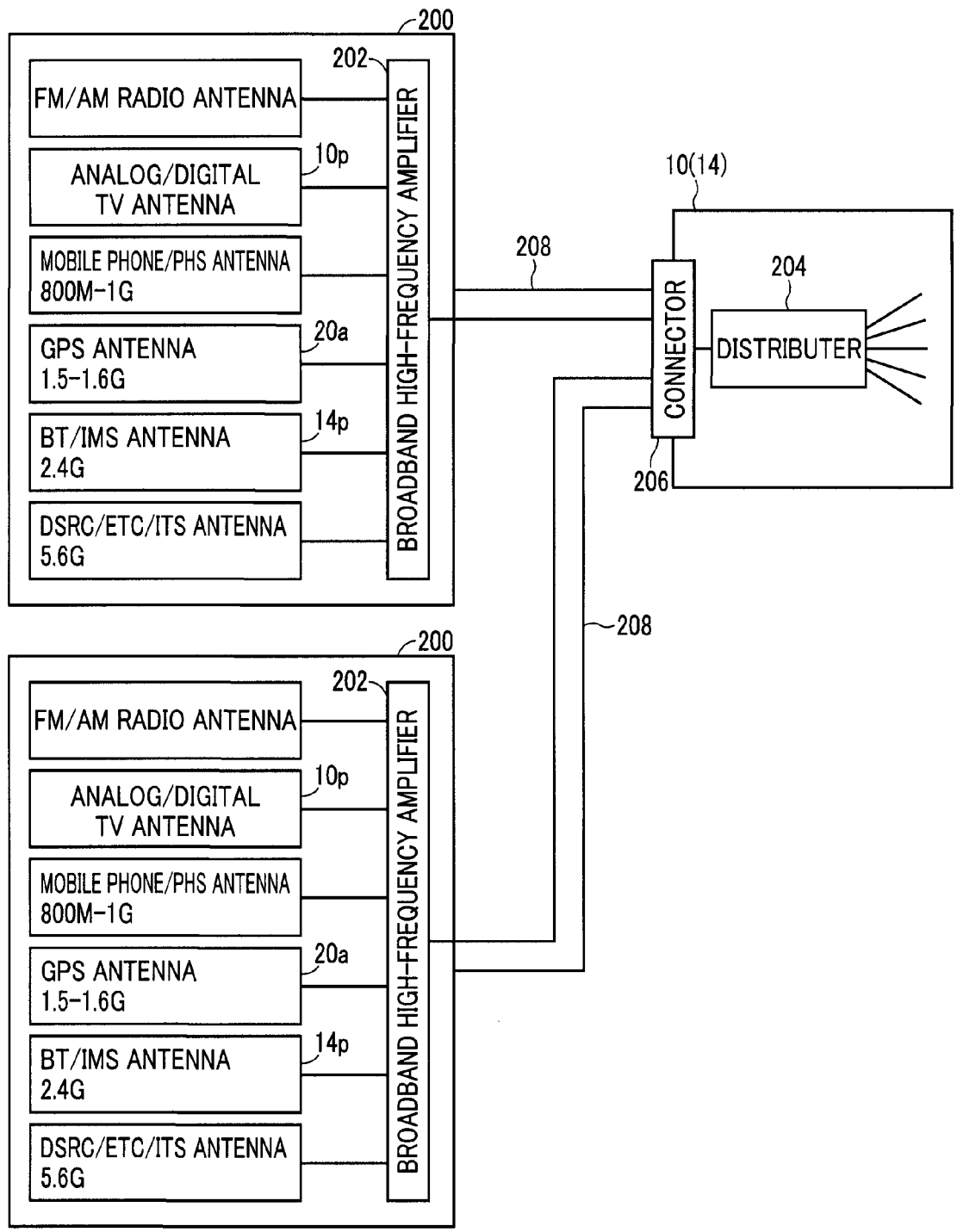

Still alternatively, a plurality of film antennas 200 may be prepared, as shown in FIG. 29, which may be stuck separately on the windshield 18, rear window, roof outer wall surface, rearview mirror, and other parts, so that the distributor 204 in the base unit 10 or the like may select the one with higher field intensity.

In the embodiment described above, in a navigation device including a base unit 10, which is fastenable to a vehicle and which has a microcomputer (system microcomputer 10$i$), and a front panel unit 14, which is attachable to and detachable from the base unit 10 and which has a microcomputer (navigation microcomputer 14$m$) having a navigation function of displaying the determined location of the vehicle on map data displayed on a liquid crystal panel (display) 14$b$, three sensors (detectors) are provided which include a receiver 20 that receives a GPS signal, a wheel speed sensor 22 that detects rotational speed of a wheel of the vehicle, and a gyro sensor 24 that detects angular velocity about a vertical axis of the vehicle, and the microcomputer of the front panel unit 14 is configured to determine one or more of the sensors to be used for determining the location of the vehicle in accordance with the output conditions of the sensors (S10 to S18). As the sensors to be used are determined in accordance with the output conditions of the sensors, it is possible to optimally select the sensors to be used for positioning, leading to an improved accuracy in determining the location of the vehicle. The flexibility of the use of the sensors in the positioning operation can also be improved in the point that the positioning does not necessarily require the use of the three sensors.

Moreover, as the device is of the detachable type as described above, the front panel unit 14 may be detached from the base unit 10 and mounted to another vehicle, or taken home for input of a destination or a route. This improves the usability as the navigation device.

Further, in a navigation device including a base unit 10, which is fastenable to a vehicle and which has a microcomputer (system microcomputer 10$i$), and a front panel unit 14, which is attachable to and detachable from the base unit and which has a microcomputer (navigation microcomputer 14$m$) having a navigation function of displaying the determined location of the vehicle on map data displayed on a liquid crystal panel (display) 14$b$, three sensors (detectors) are provided which include a receiver 20 that receives a GPS signal, a wheel speed sensor 22 that detects rotational speed of a wheel of the vehicle, and a gyro sensor 24 that detects angular velocity about a vertical axis of the vehicle, and the microcomputer of the front panel unit 14 is configured to determine one or more of the sensors to be used for determining the location of the vehicle in accordance with the attached/detached condition of the front panel unit 14 (S20 to S28). This can improve the flexibility of the use of the sensors in positioning.

Moreover, as the device is of the detachable type as described above, the front panel unit 14 may be detached from the base unit 10 and mounted to another vehicle, or taken home for input of a destination or a route. This improves the usability as the navigation device.

Further, a cradle unit 12 is provided which is fastenable to the vehicle and which has at least a microcomputer (cradle microcomputer 12$b$) and a receiver 20 that receives a GPS signal, the front panel unit 14 being attachable to and detachable from this cradle unit 12, and the microcomputer (navigation microcomputer 14$m$) of the front panel unit 14 is configured to determine the location of the vehicle using outputs of the above-described three sensors (detectors) in the case where the front panel unit 14 is attached to the base unit 10 (S24, S26), and determine the location of the vehicle using only the GPS signals in the case where the front panel unit 14 is attached to the cradle unit 12 (S24, S28). As such, in addition to the above-described effects, the cradle unit 12 to/from which the front panel unit 14 is attachable/detachable and which uses the GPS signals for positioning is provided, which can further improve the usability as the navigation device.

In order to determine the location in the three-sensor mode, the gyro sensor 24 is required. If the gyro sensor 24 is built in the front panel unit 14, gap created when attaching the front panel unit 14 or tilt resulting from tilt adjustment of the front panel unit 14 may affect the sensitivity of the sensor, possibly leading to deterioration of accuracy. Furthermore, it may adversely affect the size reduction of the front panel unit 14 itself. Still further, if the output of the wheel speed sensor should be transmitted to the front panel unit 14, the number of connection terminals between the front panel unit 14 and the base unit 10 would increase.

As a countermeasure therefor, the gyro sensor 24 may be built in the base unit 10, and the gyro data and the output of the wheel speed sensor 22 may be taken into the system microcomputer 10$i$ in the base unit 10 and then transmitted to the navigation microcomputer 14$m$ via the serial communication line. In this case, however, intervention of the system microcomputer 10$i$ may cause a delay in information transmission to the navigation microcomputer 14$m$, thereby shifting the time relative to that of the GPS data acquisition.

In essence, the data obtained by the three sensors are the location information, the travel distance information, and the direction information at each time, which need to be acquired simultaneously for processing. Any difference in the data acquisition times will affect the location accuracy.

In the navigation device according to the present embodiment, however, it is configured such that the GPS signal receiver 20 is installed in the base unit 10 as well, and that the location information obtained from the GPS, together with the gyro data and the output from the wheel speed sensor 22, are sorted and integrated in the system microcomputer 10$i$ before being transmitted to the navigation microcomputer 14$m$. As such, the delay in data transfer due to the intervention of the system microcomputer 10$i$ becomes equal for the three sensor data, whereby the inconvenience as described above is eliminated.

In this configuration, if the CPU throughput of the system microcomputer 10$i$ is high enough, the vehicle's location estimation function and/or the navigation function might also be performed on the system microcomputer 10$i$ side. However, in order to cause the map data for display created in the system microcomputer 10$i$ to be displayed on the liquid crystal panel 14$b$ in the front panel unit 14, the image data created in the system microcomputer 10$i$ would have to be either transmitted to the navigation microcomputer 14$m$ without modification and then converted into an image signal for display in the navigation microcomputer 14$m$, or converted into an analog image signal in the system microcomputer 10$i$ and then transmitted to the front panel unit 14, so as to be displayed on the liquid crystal panel 14$b$.

The map data is transmitted as color image data at a rate of one to five pages per second, resulting in large volume of data transmitted. If such data is transmitted over a parallel bus, the number of data lines (i.e. signal lines) between the front panel unit 14 and the base unit 10 will increase significantly.

If the data is transmitted over a serial data line, the serial data line will be occupied by the video data transmission due to the large transmission volume of the map data, in which case transmission of other information that should be transmitted from the system microcomputer 10*i* to the navigation microcomputer 14*m* will become slow.

Furthermore, if the navigation function is moved from the navigation microcomputer 14*m* to the system microcomputer 10*i*, although it may be possible to lower the CPU throughput of the navigation microcomputer 14*m*, a microcomputer having the throughput sufficient for navigation will have to be incorporated for each of the system microcomputer 10*i* and the cradle microcomputer 12*b*, leading to an increased system upgrade cost. It is conceivable that a user may purchase two or more cradles 12. Therefore, concentrating the high-intelligent functions on the front panel unit 14 will lower the total cost.

In view of the foregoing, according to the present embodiment, the navigation function is completed within the navigation microcomputer 14*m* in the front panel unit 14, and the system microcomputer 10*i* of the base unit 10 is made to be responsible for control of the peripheral devices.

Even in the case of connecting the GPS signal receiver 20 to the front panel unit 14, installing the gyro sensor 24 in the base unit 10, and connecting the wheel speed sensor 22 to the base unit 10, the signal data can be synchronized in the following manner.

(1) The system microcomputer 10*i* integrates the outputs from the gyro sensor 24 and the wheel speed sensor 22, and transmits them to the navigation microcomputer 14*m* together with timestamp data. In the navigation microcomputer 14*m* as well, the GPS data and the timestamp data at the time of acquisition of the GPS data are stored as a pair in the memory, and the navigation microcomputer 14*m* performs the process of estimating the vehicle's location by combining the data of the same time as the timestamp received from the system microcomputer 10*i*.

(2) A system is designed which maintains fixed intervals between the time when the system microcomputer 10*i* acquires the outputs from the wheel speed sensor 22 and the gyro sensor 24, the time when those data are transmitted to the navigation microcomputer 14*m*, and the time when the GPS data is transmitted from the GPS signal receiver 20 to the navigation microcomputer 14*m*, and the navigation microcomputer 14*m* is configured to manage the sensor signal acquisition times for synchronization.

Furthermore, in the present embodiment, as described above, in a navigation device including a base unit 10, which is fastenable to a vehicle and which has a microcomputer (system microcomputer 10*i*), and a front panel unit 14, which is attachable to and detachable from the base unit 10 and which has a microcomputer (navigation microcomputer 14*m*) having a navigation function of displaying the determined location of the vehicle on map data displayed on a display (liquid crystal panel) 14*b*, it is configured such that a short-range transceiver module (BT module) 14*q* including an antenna 14*p* and a module (wireless module) 14*x* used solely for receiving image data are arranged in the front panel unit 14 (more specifically, at the back surface thereof).

That is, the module (wireless module) 14*x* dedicated to receiving image data is arranged in the front panel unit 14 in which the navigation microcomputer 14*m* for driving the liquid crystal panel 14*b* is also arranged, enabling the images to be displayed without time lag.

It is noted that the wireless module such as the receive-only module 14*x* has a frequency band of 2.4 G. At the time of communication, it uses about one third of the permitted frequency band. Specifically, of the band divided into three, the frequency band with the most favorable communication condition is selected, and the communication is performed by maintaining the band, ensuring stable and high-speed communication. If BT (Bluetooth) communication is to be performed simultaneously using the same band, the transmission speed may decrease or noise will occur. Thus, it may be configured not to use the BT communication when the rear camera is being used, as described above in conjunction with the processing in FIG. 16.

Even in the case where the wireless module is to be used for receiving images from the front camera, one third out of the two thirds of the band still available may be used for receiving the images from the front camera, which enables stable and high-speed communication. The remaining one third of the band is secured for the BT communication, also enabling stable BT communication.

Moreover, the short-range transceiver module (BT module) 14*q* including the antenna 14*p* is arranged in the front panel unit 14 (specifically, at the back surface thereof), which facilitates transmission and reception to and from the hands-free microphone of the mobile phone in the vehicle.

Furthermore, in the present embodiment, as described above, in a navigation device including a base unit 10, which is fastenable to a vehicle and which has a microcomputer (system microcomputer 10*i*), and a front panel unit 14, which is attachable to and detachable from the base unit and which has a microcomputer (navigation microcomputer 14*m*) having a navigation function of displaying the determined location of the vehicle on map data displayed on a display (liquid crystal panel) 14*b*, three detectors (sensors) are provided which include a receiver 20 that receives a GPS signal, a wheel speed sensor 22 that detects a wheel speed, and a gyro sensor 24 that detects angular velocity about a gravity axis, and it is configured such that the location of the vehicle A is determined on the basis of the outputs from the at least three detectors, and further, the microcomputer (system microcomputer 10*i*) in the base unit 10 is configured to retain the location of the vehicle A even after the front panel unit 14 is detached, and the microcomputer (navigation microcomputer 14*m*) in the front panel unit 14 is configured to determine the location of the vehicle on the basis of the traveling condition of the vehicle (S200 to S216 in FIG. 14).

As a result, in addition to the above-described effects, the retained data can be used to quickly determine the location of the vehicle, even after the unit is detached, as long as the vehicle has not moved. In the case where the vehicle has moved, the retained data is refrained from being used, thereby preventing the use of the incorrect location data.

Furthermore, in the present embodiment, as described above, in a navigation device including a base unit 10, which is fastenable to a vehicle and which has a microcomputer (system microcomputer 10*i*), and a front panel unit 14, which is attachable to and detachable from the base unit and which has a microcomputer (navigation microcomputer 14*m*) having a navigation function of displaying the determined location of the vehicle on map data displayed on a display (liquid crystal panel) 14*b*, the display is provided with a liquid crystal panel for displaying a menu and a touch panel overlaid on the liquid crystal panel, and a control program of the microcomputer (navigation microcomputer 14*m*) of the front panel unit is configured with a graphical user interface (GUI) function which prompts a user to press on the touch panel so as to execute a specified function, an application function which executes the operation selected by the graphical user interface function, and a platform function which defines at least the processing times for the above functions, and further, it is configured such that an inerasable function button is displayed on the touch panel.

The use of the GUI allows the user to visually understand how to operate the device, ensuring easy operations for the user. The menu buttons can be narrowed down as required, ensuring easier operations for the user. In the case where the user customizes the GUI by him/herself, the user is prevented from erasing a necessary button inadvertently. Moreover, changes in accordance with the vehicle models become easy.

Furthermore, in the present embodiment, as described above, in a navigation device including a base unit 10, which is fastenable to a vehicle and which has a microcomputer (system microcomputer 10*i*), and a front panel unit 14, which is attachable to and detachable from the base unit and which has a microcomputer (navigation microcomputer 14*m*) having a navigation function of displaying the determined location of the vehicle on map data displayed on a display (liquid crystal panel) 14*b*, a tuner (one-seg TV tuner) 10*p* for receiving a TV image is arranged in the base unit 10, and it is configured such that an output (i.e. a TV image signal) from the tuner is transmitted from the microcomputer (system microcomputer 10*i*) of the base unit 10 to the front panel unit 14.

As the system microcomputer 10*i* of the base unit 10 receives the output from the wheel speed sensor 22, it is readily possible to determine whether the vehicle is traveling or not, and when determining that the vehicle is traveling, the system microcomputer 10*i* is able to restrict the operations of the one-seg TV tuner 10*g*. Further, the determination as to whether the vehicle is traveling or not and the restriction of the operations of the one-seg TV tuner l0*g* are completed inside the base unit 10, which makes it difficult to lift the restriction of the TV viewing by hacking from the outside.

Moreover, the video signal may be converted into a digital signal in the one-seg TV tuner l0*g* before being transmitted to the front panel unit 14. This can reduce the effects of the impedance on the path and noise, so that the video image quality can be improved.

Furthermore, in the present embodiment, as described above, in a navigation device including a base unit 10, which is fastenable to a vehicle and which has a microcomputer (system microcomputer 10*i*), and a front panel unit 14, which is attachable to and detachable from the base unit and which has a microcomputer (navigation microcomputer 14*m*) having a navigation function of displaying the determined location of the vehicle on map data displayed on a display (liquid crystal panel) 14*b*, there are provided a cradle unit 12 which is attachable to and detachable from the front panel unit and which has a microcomputer (cradle microcomputer 12*b*), an FM transmitter 12*e* which is arranged in the cradle unit 12, and a means (EEPROM 12*f*) for storing a database of frequencies of local radio stations in a region where the vehicle travels, and the microcomputer (cradle microcomputer 12*b*) in the cradle unit 12 is configured to search for an unused frequency in accordance with the region where the vehicle is traveling and to cause the frequency to be displayed on the display (liquid crystal panel 14*b*) in the front panel unit 14. the front panel unit and which has a microcomputer (cradle microcomputer 12*b*), an FM transmitter 12*e* which is arranged in the cradle unit 12, and a means (EEPROM 12*f*) for storing a database of frequencies of local radio stations in a region where the vehicle travels, and the microcomputer (cradle microcomputer 12*b*) in the cradle unit 12 is configured to search for an unused frequency in accordance with the region where the vehicle is traveling and to cause the frequency to be displayed on the display (liquid crystal panel 14*b*) in the front panel unit 10.

More specifically, the cradle unit 12 to and from which the front panel unit 14 is attachable and detachable and which has the microcomputer (cradle microcomputer 12*b*) is provided, and the FM transmitter 12*e* is arranged in the cradle unit 12, and the microcomputer (cradle microcomputer 12*b*) of the cradle unit 12 is configured to search for the unused frequency in accordance with the region where the vehicle is traveling and to cause the frequency to be displayed on the liquid crystal panel 14*b* in the front panel unit 14.

Accordingly, by tuning the receiver to the frequency, the user can cause the music content and/or the voice guidance to be output from the vehicle-mounted speaker for listening. The user can listen to the music content and/or the voice guidance in a low-noise condition.

FIG. 30 is a flowchart, similar to the flowchart in FIG. 10, illustrating the operations of the navigation device according to a second embodiment of the present invention. This processing is executed by the navigation microcomputer 14*m*, as in the case of the flowchart in FIG. 10.

The illustrated processing is started when a sensor mode switching screen that is displayed as appropriate on the touch panel 14*s* arranged on the liquid crystal panel 14*b* is operated by a user, i.e., when the touch panel 14*s* is pressed.

Firstly, in S900, the sensor mode switching screen is displayed in accordance with the touch panel operation, to prompt the user to make a selection. Next, in S902, it is determined whether the user has selected the single-sensor mode. In other words, it is determined whether an instruction regarding the detectors to be used for determination of the location of the vehicle A has been received from the outside.

If YES, the process proceeds to S904, where the mode for the vehicle location estimation is set to the single-sensor mode, in which the vehicle location (of the vehicle A) is determined on the basis of the output (i.e. GPS signals) from the GPS signal receiver 20.

On the other hand, if NO, the process proceeds to S906, where the mode for the vehicle location estimation is set to the the three-sensor mode, in which the vehicle location (of the vehicle A) is determined on the basis of the outputs from the three sensors (the GPS signal receiver 20, the wheel speed sensor 22, and the gyro sensor). In other words, the detectors to be used for determining the location of the vehicle A are determined in accordance with an instruction from the outside.

It is note that, in the navigation microcomputer 14*m*, in the case where the three-sensor mode or the single-sensor mode has been determined in the processing of the flowchart shown in FIG. 10 or 11, the processing in FIG. 30 is given higher priority.

This will be described in more detail. A certain situation may arise that the user can know well or nobody other than the user can detect, such as that the vehicle tires are replaced with snow tires or other tires having different diameters, or that the road conditions considerably change, for example when the road surface changes from a normal surface to a slippery, freezing surface. The same applies to the case where the vehicle itself is new and, hence, the navigation microcomputer 14*m* (or the system microcomputer 10*i*) has not finished learning the outputs from the wheel speed sensor 22 sufficiently.

In such a case, an error will occur if the vehicle location is determined in the three-sensor mode using the output from the wheel speed sensor 22. Thus, it is configured to allow the user to issue an instruction from the outside to select the sensors to be used, more specifically to select the single-sensor mode, in accordance with the situation. The instruc tion from the outside is not limited to the one input by the user, dealer, operator, or other person. It may be a signal input from another device.

Further, the navigation microcomputer 14*m* may be configured to forcibly switch the mode from the single-sensor mode, as determined in the processing in S904, to the three-sensor mode when the learning period in the new environment is completed and, thus, sufficient accuracy is ensured in positioning using the wheel speed sensor 22.

In the second embodiment, as described above, in a navigation device including a base unit 10, which is fastenable to a vehicle and which has a microcomputer (system microcomputer 10*i*), and a front panel unit 14, which is attachable to and detachable from the base unit 10 and which has a microcomputer (navigation microcomputer 14*m*) having a navigation function of displaying the determined location of the vehicle on map data displayed on a liquid crystal panel (display) 14*b*, three sensors (detectors) are provided which include a receiver 20 that receives a GPS signal, a wheel speed sensor 22 that detects rotational speed of a wheel of the vehicle, and a gyro sensor 24 that detects angular velocity about a vertical axis of the vehicle, and the microcomputer of the front panel unit 14 is configured, in the case where there is an instruction from the outside regarding the detectors to be used for determination of the location of the vehicle (S900, S902), to determine the sensors to be used for determination of the location of the vehicle in accordance with the instruction (S904, S906).

Accordingly, in occurrence of a certain situation that the user can know well, for example in occurrence of a considerable change in road surface conditions, such as when the vehicle tires are replaced with snow tires or other tires having different diameters, or when the road surface changes from a normal surface to a slippery, freezing surface, the sensors can be selected in accordance with the situation. This can further improve the accuracy in determination of the location of the vehicle.

While it has been assumed in the above embodiments that there are two or more base units 10 or cradle units 12, there may be a single base unit 10 or cradle unit 12.

The invention claimed is:

1. A navigation device including a base portion mounted to a body of a vehicle and a display portion detachably mounted to be connected to the base portion, the display portion having a navigation function of displaying map data on a front panel and displaying a location of the vehicle on the map data, the navigation device comprising:
   an authentication unit configured to confirm that the display portion has been connected to the base portion and, when confirmed, to perform authentication, and when the authentication code is determined to be correct, said authentication unit is adapted to enable operation of an electrical control unit of the vehicle so as to start the engine of said vehicle by operating an ignition key of the vehicle, wherein
   the base portion comprises either a base unit secured to an inside of the vehicle or a cradle unit detachably mounted to the inside of the vehicle,
   the base unit, the cradle unit, and the display portion each store an authentication code, and
   the authentication unit is installed in the base unit or the cradle unit and performs the authentication by confirming that the authentication code stored in the base unit or the cradle unit has a predetermined relationship with the authentication code stored in the display portion.

2. The navigation device according to claim 1, wherein the authentication code is changeable by inputting the current authentication code into the display portion in the state where the display portion is detached from the base portion.

3. The navigation device according to claim 2, wherein the authentication code is set to be changeable only at a location corresponding to present location information.

4. The navigation device according to claim 1, further comprising:
   an image pickup device mounted to the vehicle; and
   a transmitter configured to transmit an image signal thereof;
   wherein an authentication code is added to the image signal and the resultant signal is transmitted to the display portion that has been detached.

* * * * *